US011921789B2

(12) United States Patent
Callanta et al.

(10) Patent No.: US 11,921,789 B2
(45) Date of Patent: Mar. 5, 2024

(54) SEARCH ENGINE TRAINING APPARATUS AND METHOD AND SEARCH ENGINE TRAINED USING THE APPARATUS AND METHOD

(71) Applicant: McMaster-Carr Supply Company, Elmhurst, IL (US)

(72) Inventors: Ben C. Callanta, Elmhurst, IL (US); Deric A. Bertrand, Naperville, IL (US); Gracelyn R. Newhouse, Chicago, IL (US); John N. Rosensweig, Chicago, IL (US); Bina M. Vasavda, Lincolnshire, IL (US); Ross P. Kelly, Chicago, IL (US); Larry G. Kirby, Skokie, IL (US); Matthew T. Hayden, Chicago, IL (US); Emily R. Rapport, Chicago, IL (US)

(73) Assignee: MCMASTER-CARR SUPPLY COMPANY, Elmhurst, IL (US)

(*) Notice: Subject to any disclaimer, the term of this patent is extended or adjusted under 35 U.S.C. 154(b) by 787 days.

(21) Appl. No.: 16/576,427

(22) Filed: Sep. 19, 2019

(65) Prior Publication Data

US 2021/0089585 A1    Mar. 25, 2021

(51) Int. Cl.
*G06F 16/9032* (2019.01)
*G06F 40/56* (2020.01)
*G06N 20/00* (2019.01)

(52) U.S. Cl.
CPC ........ *G06F 16/90324* (2019.01); *G06F 40/56* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 7,685,276 B2 | 3/2010 | Konig et al. |
| 7,844,599 B2 | 11/2010 | Kasperski et al. |
| 7,984,004 B2 | 7/2011 | Andrew et al. |
| 8,082,264 B2 | 12/2011 | Bierner |
| 8,180,754 B1 | 5/2012 | Ershov |
| 8,478,780 B2 | 7/2013 | Cooper et al. |

(Continued)

FOREIGN PATENT DOCUMENTS

CN        107480130 A        12/2017

OTHER PUBLICATIONS

Publication Bhargava, Data Mining by Decomposition: Adaptive Search for Hypothesis Generation—1999.

(Continued)

*Primary Examiner* — Amresh Singh
(74) *Attorney, Agent, or Firm* — ArentFox Schiff LLP

(57) ABSTRACT

An apparatus and method for training a search engine generates synthetic search arguments and target information that are provided to the search engine as training. A search argument simulator ingests product information and historical interaction data, determines relevant descriptors, creates compound descriptors, and creates candidate search arguments. A trainer checks the candidates against historical search arguments, identifies similar search arguments and determines likely search arguments that are used for training. An evaluator monitors search engine responses and triggers retraining of the search engine.

27 Claims, 14 Drawing Sheets

(56) References Cited

U.S. PATENT DOCUMENTS

| | | | |
|---|---|---|---|
| 8,812,534 B2 | 8/2014 | Platt et al. | |
| 8,984,012 B2 | 3/2015 | Ramsey et al. | |
| 9,330,165 B2 | 5/2016 | Jiang et al. | |
| 9,405,794 B2 | 8/2016 | Prakash et al. | |
| 9,477,782 B2 | 10/2016 | Marantz et al. | |
| 9,652,797 B2 | 5/2017 | Vijayaraghavan et al. | |
| 9,679,259 B1 | 6/2017 | Frind et al. | |
| 10,089,580 B2 | 10/2018 | Shan et al. | |
| 2009/0062952 A1* | 3/2009 | Sullivan | G06F 30/00 700/109 |
| 2012/0191745 A1 | 7/2012 | Velipasaoglu et al. | |
| 2017/0099249 A1* | 4/2017 | Kozareva | G06F 16/353 |
| 2018/0121443 A1* | 5/2018 | Bao | G06F 16/36 |
| 2020/0089800 A1* | 3/2020 | Bhojwani | G06F 16/23 |

OTHER PUBLICATIONS

Ivan Mamontov et al., Grid Dynamics "How to implement autocomplete search for large-scale e-commerce catalogsCalculate Query Suggestions", Feb. 14, 2018.

* cited by examiner

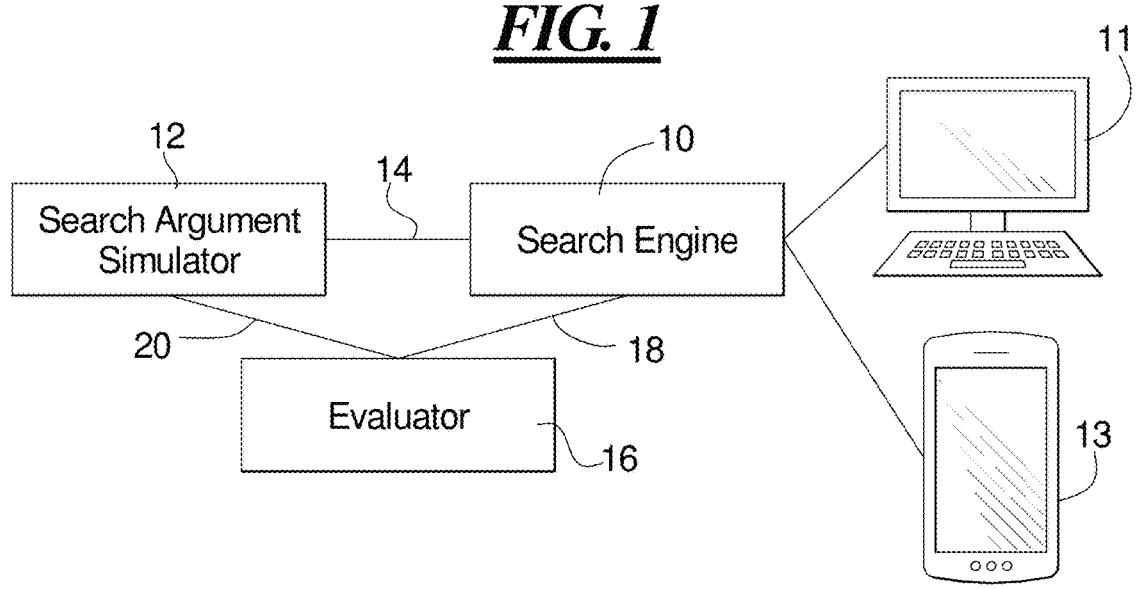
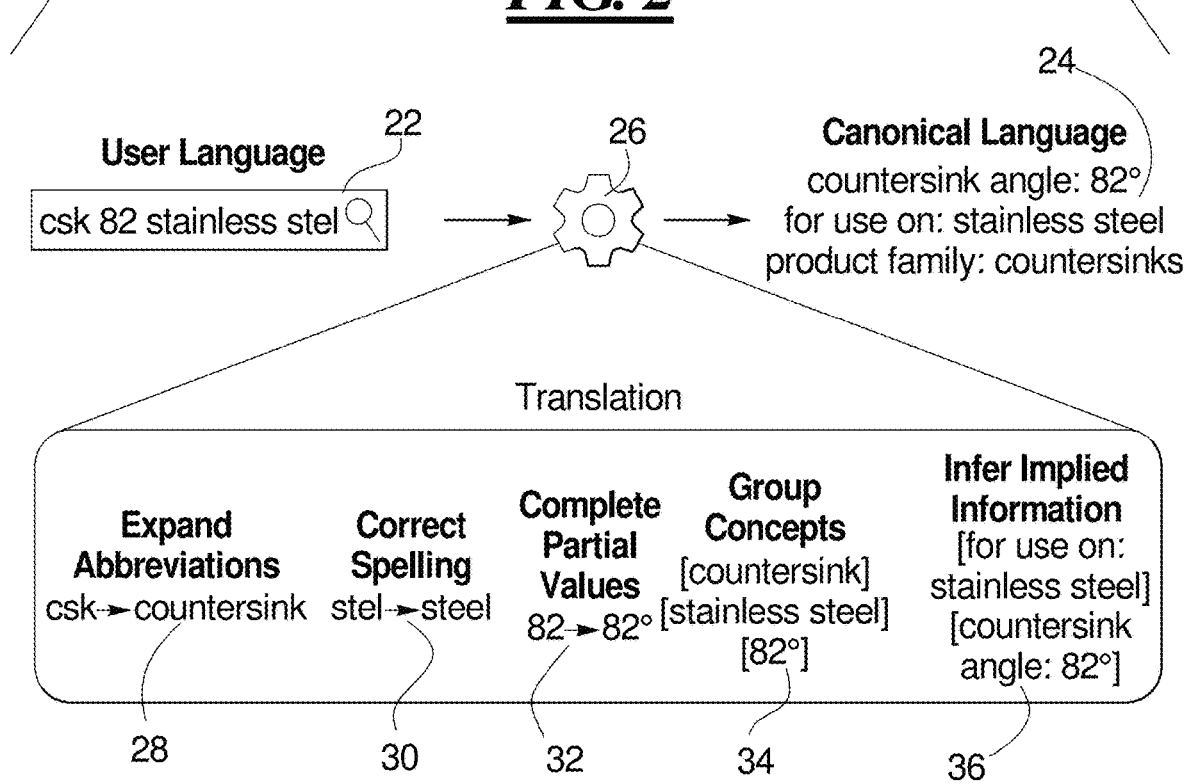

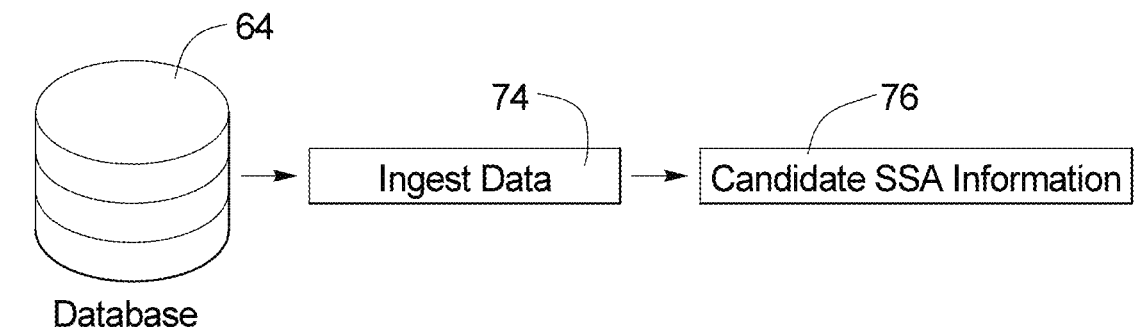
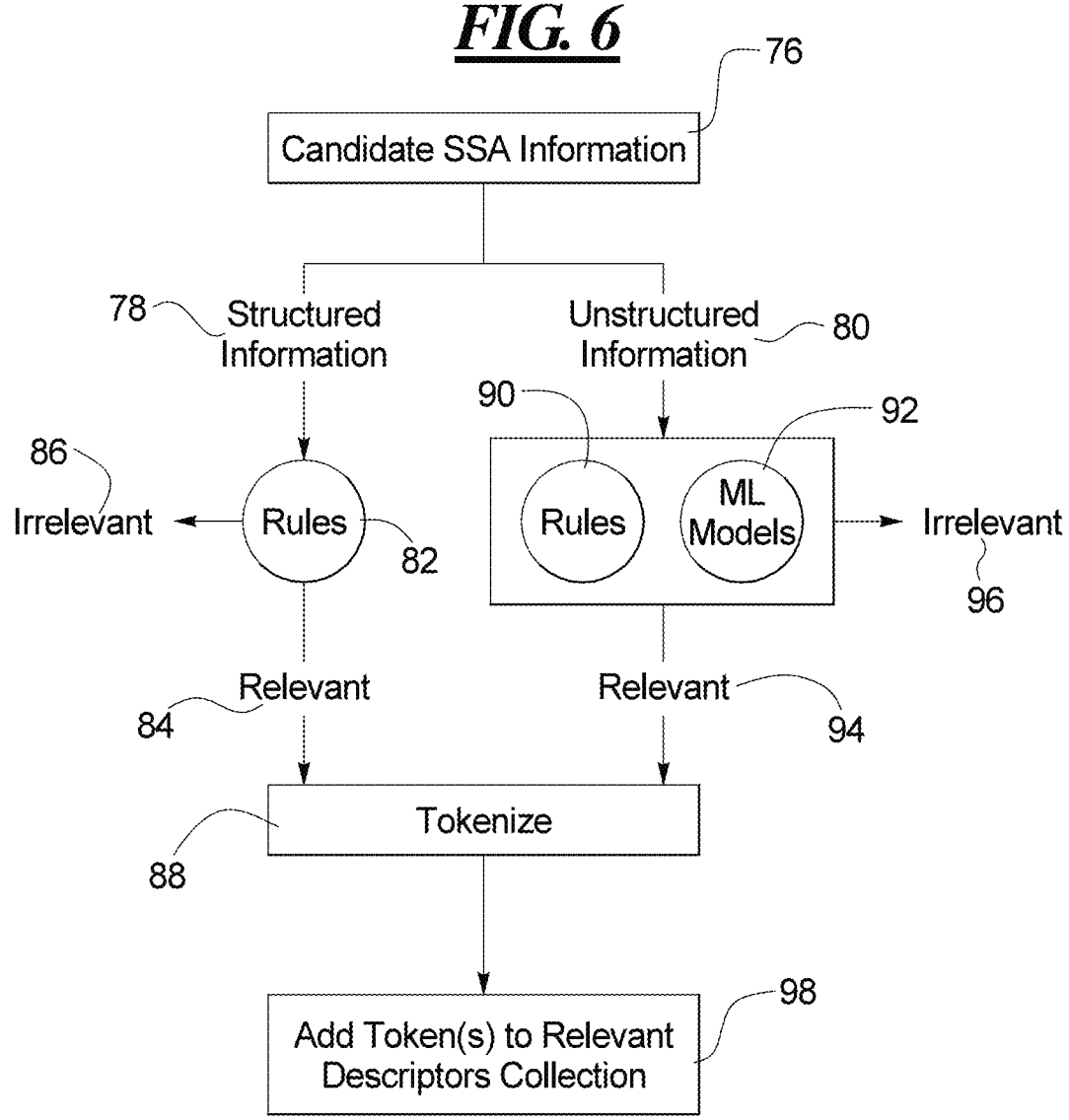

FIG. 11a

| pattern (160) | product (162) | ssa (164) | target (166) |
|---|---|---|---|
| product group only | Countersink A | countersinks | product group: countersinks |
| value plus product group | Countersink A | high-speed steel countersinks | product group: countersinks, material: high-speed steel |
| value plus product group | Countersink A | highspeedsteel countersinks | product group: countersinks, material: high-speed steel |
| value plus product group | Countersink A | high speed steel countersinks | product group: countersinks, material: high-speed steel |
| value plus product group | Countersink A | steel countersinks | product group: countersinks, material: high-speed steel |
| value plus product group | Countersink A | high-speedcountersinks | product group: countersinks, material: high-speed steel |
| value plus product group | Countersink A | 1/4" countersinks | product group: countersinks, body diameter: 1/4" |
| value plus product group | Countersink A | 1/4 countersinks | product group: countersinks, body diameter: 1/4" |
| value plus product group | Countersink A | 0.25" countersinks | product group: countersinks, body diameter: 1/4" |
| value plus product group | Countersink A | 0.25 countersinks | product group: countersinks, body diameter: 1/4" |
| value plus product group | Countersink A | quarter-inch countersinks | product group: countersinks, body diameter: 1/4" |
| value plus product group | Countersink A | quarter-inch countersinks | product group: countersinks, body diameter: 1/4" |
| value plus product group | Countersink A | aluminum countersinks | product group: countersinks, for use on: aluminum |
| value plus product group | Countersink A | brass countersink | product group: countersinks, for use on: brass |
| value plus product group | Countersink A | bronze countersinks | product group: countersinks, for use on: bronze |
| value plus product group | Countersink A | iron countersinks | product group: countersinks, for use on: iron |
| value plus product group | Countersink A | fe countersinks | product group: countersinks, for use on: iron |
| value plus product group | Countersink A | stainless steel countersinks | product group: countersinks, for use on: stainless steel |
| value plus product group | Countersink A | stainless countersinks | product group: countersinks, for use on: stainless steel |
| value plus product group | Countersink A | steel countersinks | product group: countersinks, for use on: steel |
| value plus product group | Countersink A | plastic countersinks | product group: countersinks, for use on: plastic |
| product group only | Countersink A | countersink | product group: countersinks |
| value plus product group | Countersink A | high-speed steel countersink | product group: countersinks, material: high-speed steel |
| value plus product group | Countersink A | high-speed steel countersink | product group: countersinks, material: high-speed steel |
| value plus product group | Countersink A | high-speedsteel countersink | product group: countersinks, material: high-speed steel |
| value plus product group | Countersink A | steel countersink | product group: countersinks, material: high-speed steel |
| value plus product group | Countersink A | high-speedcountersink | product group: countersinks, material: high-speed steel |
| value plus product group | Countersink A | 1/4" countersink | product group: countersinks, body diameter: 1/4" |
| value plus product group | Countersink A | 1/4 countersink | product group: countersinks, body diameter: 1/4" |
| value plus product group | Countersink A | 0.25" countersink | product group: countersinks, body diameter: 1/4" |
| value plus product group | Countersink A | 0.25 countersink | product group: countersinks, body diameter: 1/4" |
| value plus product group | Countersink A | quarter-inchcountersink | product group: countersinks, body diameter: 1/4" |
| value plus product group | Countersink A | quarter inch countersink | product group: countersinks, body diameter: 1/4" |
| value plus product group | Countersink A | aluminum countersink | product group: countersinks, for use on: aluminum |
| value plus product group | Countersink A | brasscountersink | product group: countersinks, for use on: brass |
| value plus product group | Countersink A | bronze countersink | product group: countersinks, for use on: bronze |
| value plus product group | Countersink A | iron countersink | product group: countersinks, for use on: iron |
| value plus product group | Countersink A | fe countersink | product group: countersinks, for use on: iron |
| value plus product group | Countersink A | stainlesssteelcountersink | product group: countersinks, for use on: stainless steel |
| value plus product group | Countersink A | stainless countersink | product group: countersinks, for use on: stainless steel |
| value plus product group | Countersink A | steel countersink | product group: countersinks, for use on: steel |
| value plus product group | Countersink A | plasticcountersink | product group: countersinks, for use on: plastic |
| product group only | Countersink A | csk | product group: countersinks |
| value plus product group | Countersink A | high-speedsteel csk | product group: countersinks, material: high-speed steel |
| value plus product group | Countersink A | highspeedsteel csk | product group: countersinks, material: high-speed steel |
| value plus product group | Countersink A | high speedsteel csk | product group: countersinks, material: high-speed steel |
| value plus product group | Countersink A | steel csk | product group: countersinks, material: high-speed steel |
| value plus product group | Countersink A | high-speed csk | product group: countersinks, material: high-speed steel |
| value plus product group | Countersink A | 1/4" csk | product group: countersinks, body diameter: 1/4" |
| value plus product group | Countersink A | 1/4 csk | product group: countersinks body diameter: 1/4" |
| value plus product group | Countersink A | 0.25" csk | product group: countersinks, body diameter: 1/4" |
| value plus product group | Countersink A | 0.25csk | product group: countersinks, body diameter: 1/4" |
| value plus product group | Countersink A | quarter-inch csk | product group: countersinks, body diameter: 1/4" |
| value plus product group | Countersink A | quarter inch | product group: countersinks, body diameter: 1/4" |
| value plus product group | Countersink A | aluminum csk | product group: countersinks, for use on: aluminum |
| value plus product group | Countersink A | brass csk | product group: countersinks, for use on: brass |
| value plus product group | Countersink A | bronze csk | product group: countersinks, for use on: bronze |
| value plus product group | Countersink A | iron csk | product group: countersinks, for use on: iron |
| value plus product group | Countersink A | fe csk | product group: countersinks, for use on: iron |
| value plus product group | Countersink A | stainlesssteel csk | product group: countersinks, for use on: stainless steel |
| value plus product group | Countersink A | stainlesscsk | product group: countersinks, for use on: stainless steel |
| value plus product group | Countersink A | steel csk | product group: countersinks, for use on: steel |
| value plus product group | Countersink A | plastic csk | product group: countersinks, for use on: plastic |
| product group only | Countersink A | csnk | product group: countersinks |
| value plus product group | Countersink A | high-speed steel csnk | product group: countersinks, material: high-speed steel |
| value plus product group | Countersink A | highspeed steel csnk | product group: countersinks, material: high-speed steel |
| value plus product group | Countersink A | high speed steel csnk | product group: countersinks, material: high-speed steel |
| value plus product group | Countersink A | steel csnk | product group: countersinks, material: high-speed steel |
| value plus product group | Countersink A | high-speedcsnk | product group: countersinks, material: high-speed steel |
| value plus product group | Countersink A | 1/4" csnk | product group: countersinks, body diameter: 1/4" |
| value plus product group | Countersink A | 1/4 csnk | product group: countersinks, body diameter: 1/4" |
| value plus product group | Countersink A | 0.25" csnk | product group: countersinks, body diameter: 1/4" |
| value plus product group | Countersink A | 0.25csnk | product group: countersinks, body diameter: 1/4" |
| value plus product group | Countersink A | quarter-inch c-snk | product group: countersinks, body diameter: 1/4" |
| value plus product group | Countersink A | quarter inch csnk | product group: countersinks, body diameter: 1/4" |
| value plus product group | Countersink A | aluminum c-snk | product group: countersinks, for use on: aluminum |
| value plus product group | Countersink A | brass csnk | product group: countersinks, for use on: brass |
| value plus product group | Countersink A | bronze csnk | product group: countersinks, for use on: bronze |
| value plus product group | Countersink A | iron csnk | product group: countersinks, for use on: iron |
| value plus product group | Countersink A | fe csnk | product group: countersinks, for use on: iron |
| value plus product group | Countersink A | stainless steel csnk | product group: countersinks, for use on: stainless steel |
| value plus product group | Countersink A | stainless csnk | product group: countersinks, for use on: stainless steel |
| value plus product group | Countersink A | steel csnk | product group: countersinks, for use on: steel |

| value plus product group / product group only | Countersink A / Countersink B | term | product group / attribute |
|---|---|---|---|
| value plus product group | Countersink A | plastic csnk (164) | product group: countersinks, for use on: plastic (166) |
| product group only | Countersink B | countersinks | product group: countersinks |
| value plus product group (160) | Countersink B (162) | uncoated carbide countersinks | product group: countersinks, material: uncoated carbide |
| value plus product group | Countersink B | uncoated countersinks | product group: countersinks, material: uncoated carbide |
| value plus product group | Countersink B | carbide countersinks | product group: countersinks, material: uncoated carbide |
| value plus product group | Countersink B | wc countersinks | product group: countersinks, material: uncoated carbide |
| value plus product group | Countersink B | 1/4" countersinks | product group: countersinks, body diameter: 1/4" |
| value plus product group | Countersink B | 1/4 countersinks | product group: countersinks, body diameter: 1/4" |
| value plus product group | Countersink B | 0.25" countersinks | product group: countersinks, body diameter: 1/4" |
| value plus product group | Countersink B | 0.25 countersinks | product group: countersinks, body diameter: 1/4" |
| value plus product group | Countersink B | quarter-inch countersinks | product group: countersinks, body diameter: 1/4" |
| value plus product group | Countersink B | quarter inch countersinks | product group: countersinks, body diameter: 1/4" |
| value plus product group | Countersink B | aluminum countersinks | product group: countersinks, for use on: aluminum |
| value plus product group | Countersink B | brass countersinks | product group: countersinks, for use on: brass |
| value plus product group | Countersink B | bronze countersinks | product group: countersinks, for use on: bronze |
| value plus product group | Countersink B | fiberglass countersinks | product group: countersinks, for use on: fiberglass |
| value plus product group | Countersink B | hardened steel countersinks | product group: countersinks, for use on: hardened steel |
| value plus product group | Countersink B | hardened countersinks | product group: countersinks, for use on: hardened steel |
| value plus product group | Countersink B | iron countersinks | product group: countersinks, for use on: iron |
| value plus product group | Countersink B | fe countersinks | product group: countersinks, for use on: iron |
| value plus product group | Countersink B | nickel countersinks | product group: countersinks, for use on: nickel |
| value plus product group | Countersink B | ni countersinks | product group: countersinks, for use on: nickel |
| value plus product group | Countersink B | plastic countersinks | product group: countersinks, for use on: plastic |
| value plus product group | Countersink B | stainless steel countersinks | product group: countersinks, for use on: stainless steel |
| value plus product group | Countersink B | stainless countersinks | product group: countersinks, for use on: stainless steel |
| value plus product group | Countersink B | steel countersinks | product group: countersinks, for use on: steel |
| value plus product group | Countersink B | titanium countersinks | product group: countersinks, for use on: titanium |
| value plus product group | Countersink B | ti countersinks | product group: countersinks, for use on: titanium |
| value plus product group | Countersink B | tool steel countersinks | product group: countersinks, for use on: tool steel |
| value plus product group | Countersink B | tool countersinks | product group: countersinks, for use on: tool steel |
| product group only | Countersink B | countersink | product group: countersinks |
| value plus product group | Countersink B | uncoated carbide countersink | product group: countersinks, material: uncoated carbide |
| value plus product group | Countersink B | uncoated countersink | product group: countersinks, material: uncoated carbide |
| value plus product group | Countersink B | carbide countersink | product group: countersinks, material: uncoated carbide |
| value plus product group | Countersink B | wc countersink | product group: countersinks, material: uncoated carbide |
| value plus product group | Countersink B | 1/4" countersink | product group: countersinks, body diameter: 1/4" |
| value plus product group | Countersink B | 1/4 countersink | product group: countersinks, body diameter: 1/4" |
| value plus product group | Countersink B | 0.25" countersink | product group: countersinks, body diameter: 1/4" |
| value plus product group | Countersink B | 0.25 countersink | product group: countersinks, body diameter: 1/4" |
| value plus product group | Countersink B | quarter-inch countersink | product group: countersinks, body diameter: 1/4" |
| value plus product group | Countersink B | quarter inch countersink | product group: countersinks, body diameter: 1/4" |
| value plus product group | Countersink B | aluminum countersink | product group: countersinks, for use on: aluminum |
| value plus product group | Countersink B | brass countersink | product group: countersinks, for use on: brass |
| value plus product group | Countersink B | bronze countersink | product group: countersinks, for use on: bronze |
| value plus product group | Countersink B | fiberglass countersink | product group: countersinks, for use on: fiberglass |
| value plus product group | Countersink B | hardened steel countersink | product group: countersinks, for use on: hardened steel |
| value plus product group | Countersink B | hardened countersink | product group: countersinks, for use on: hardened steel |
| value plus product group | Countersink B | iron countersink | product group: countersinks, for use on: iron |
| value plus product group | Countersink B | fe countersink | product group: countersinks, for use on: iron |
| value plus product group | Countersink B | nickel countersink | product group: countersinks, for use on: nickel |
| value plus product group | Countersink B | ni countersink | product group: countersinks, for use on: nickel |
| value plus product group | Countersink B | plastic countersink | product group: countersinks, for use on: plastic |
| value plus product group | Countersink B | stainless steel countersink | product group: countersinks, for use on: stainless steel |
| value plus product group | Countersink B | stainless countersink | product group: countersinks, for use on: stainless steel |
| value plus product group | Countersink B | steel countersink | product group: countersinks, for use on: steel |
| value plus product group | Countersink B | titanium countersink | product group: countersinks, for use on: titanium |
| value plus product group | Countersink B | ti countersink | product group: countersinks, for use on: titanium |
| value plus product group | Countersink B | tool steel countersink | product group: countersinks, for use on: tool steel |
| value plus product group | Countersink B | tool countersink | product group: countersinks, for use on: tool steel |
| product group only | Countersink B | csk | product group: countersinks |
| value plus product group | Countersink B | uncoated carbide csk | product group: countersinks, material: uncoated carbide |
| value plus product group | Countersink B | uncoated csk | product group: countersinks, material: uncoated carbide |
| value plus product group | Countersink B | carbide csk | product group: countersinks, material: uncoated carbide |
| value plus product group | Countersink B | wc csk | product group: countersinks, material: uncoated carbide |
| value plus product group | Countersink B | 1/4" csk | product group: countersinks, body diameter: 1/4" |
| value plus product group | Countersink B | 1/4 csk | product group: countersinks, body diameter: 1/4" |
| value plus product group | Countersink B | 0.25" csk | product group: countersinks, body diameter: 1/4" |
| value plus product group | Countersink B | 0.25 csk | product group: countersinks, body diameter: 1/4" |
| value plus product group | Countersink B | quarter-inch csk | product group: countersinks, body diameter: 1/4" |
| value plus product group | Countersink B | quarter inch csk | product group: countersinks, body diameter: 1/4" |
| value plus product group | Countersink B | aluminum csk | product group: countersinks, for use on: aluminum |
| value plus product group | Countersink B | brass csk | product group: countersinks, for use on: brass |
| value plus product group | Countersink B | bronze csk | product group: countersinks, for use on: bronze |
| value plus product group | Countersink B | fiberglass csk | product group: countersinks, for use on: fiberglass |
| value plus product group | Countersink B | hardened steel csk | product group: countersinks, for use on: hardened steel |
| value plus product group | Countersink B | hardened csk | product group: countersinks, for use on: hardened steel |
| value plus product group | Countersink B | iron csk | product group: countersinks, for use on: iron |
| value plus product group | Countersink B | fe csk | product group: countersinks, for use on: iron |
| value plus product group | Countersink B | nickel csk | product group: countersinks, for use on: nickel |
| value plus product group | Countersink B | ni csk | product group: countersinks, for use on: nickel |
| value plus product group | Countersink B | plastic csk | product group: countersinks, for use on: plastic |
| value plus product group | Countersink B | stainless steel csk | product group: countersinks, for use on: stainless steel |
| value plus product group | Countersink B | stainless csk | product group: countersinks, for use on: stainless steel |
| value plus product group | Countersink B | steel csk | product group: countersinks, for use on: steel |
| value plus product group | Countersink B | titanium csk | product group: countersinks, for use on: titanium |
| value plus product group | Countersink B | ti csk | product group: countersinks, for use on: titanium |
| value plus product group | Countersink B | tool steel csk | product group: countersinks, for use on: tool steel |
| value plus product group | Countersink B | tool csk (158) | product group: countersinks, for use on: tool steel |

FIG. 11c

| 160 | 162 | 164 | 166 |
|---|---|---|---|
| product group only | Countersink B | csnk | product group: countersinks |
| value plus product group | Countersink B | uncoated carbide csnk | product group: countersinks, material: uncoated carbide |
| value plus product group | Countersink B | uncoated csnk | product group: countersinks, material: uncoated carbide |
| value plus product group | Countersink B | carbide csnk | product group: countersinks, material: uncoated carbide |
| value plus product group | Countersink B | wc csnk | product group: countersinks, material: uncoated carbide |
| value plus product group | Countersink B | 1/4" csnk | product group: countersinks, body diameter: 1/4" |
| value plus product group | Countersink B | 1/4 csnk | product group: countersinks, body diameter: 1/4" |
| value plus product group | Countersink B | 0.25" csnk | product group: countersinks, body diameter: 1/4" |
| value plus product group | Countersink B | 0.25 csnk | product group: countersinks, body diameter: 1/4" |
| value plus product group | Countersink B | quarter-inch csnk | product group: countersinks, body diameter: 1/4" |
| value plus product group | Countersink B | quarter inch csnk | product group: countersinks, body diameter: 1/4" |
| value plus product group | Countersink B | aluminum csnk | product group: countersinks, for use on: aluminum |
| value plus product group | Countersink B | brass csnk | product group: countersinks, for use on: brass |
| value plus product group | Countersink B | bronze csnk | product group: countersinks, for use on: bronze |
| value plus product group | Countersink B | fiberglass csnk | product group: countersinks, for use on: fiberglass |
| value plus product group | Countersink B | hardened steel csnk | product group: countersinks, for use on: hardened steel |
| value plus product group | Countersink B | hardened csnk | product group: countersinks, for use on: hardened steel |
| value plus product group | Countersink B | iron csnk | product group: countersinks, for use on: iron |
| value plus product group | Countersink B | fe csnk | product group: countersinks, for use on: iron |
| value plus product group | Countersink B | nickel csnk | product group: countersinks, for use on: nickel |
| value plus product group | Countersink B | ni csnk | product group: countersinks, for use on: nickel |
| value plus product group | Countersink B | plastic csnk | product group: countersinks, for use on: plastic |
| value plus product group | Countersink B | stainless steel csnk | product group: countersinks, for use on: stainless steel |
| value plus product group | Countersink B | stainless csnk | product group: countersinks, for use on: stainless steel |
| value plus product group | Countersink B | steel csnk | product group: countersinks, for use on: steel |
| value plus product group | Countersink B | titanium csnk | product group: countersinks, for use on: titanium |
| value plus product group | Countersink B | ti csnk | product group: countersinks, for use on: titanium |
| value plus product group | Countersink B | tool steel csnk | product group: countersinks, for use on: tool steel |
| value plus product group | Countersink B | tool csnk | product group: countersinks, for use on: tool steel |

| 160 | 162 | 164 | 166 |
|---|---|---|---|
| value plus product group | Countersink A | 1/4 countersink | product group: countersinks, body diameter: 1/4" |
| value plus product group | Countersink A | 0.25 countersink | product group: countersinks, body diameter: 1/4" |
| product group only | Countersink A | csk | product group: countersinks |
| product group only | Countersink A | csnk | product group: countersinks |
| value plus product group | Countersink B | 1/4 countersink | product group: countersinks, body diameter: 1/4" |
| value plus product group | Countersink B | 0.25 countersink | product group: countersinks, body diameter : 1/4" |
| product group only | Countersink B | csk | product group: counter sinks |
| product group only | Countersink B | csnk | product group: countersinks |

| 160 | 162 | 164 | 166 |
|---|---|---|---|
| product group only | Countersink B | csnk | product group: counter sinks |
| product group only | Countersink A | countersinks | product group: countersinks |
| product group only | Countersink A | countersink | product group: countersinks |
| product group only | Countersink B | countersink | product group: countersinks |
| product group only | Countersink B | countersink | product group: countersinks |

| 160 | 162 | 164 | 166 |
|---|---|---|---|
| value plus product group | Countersink A | 1/4 countersink | product group: countersinks, body diameter: 1/4" |
| value plus product group | Countersink A | 0.25 countersink | product group: countersinks, body diameter: 1/4" |
| product group only | Countersink A | csk | product group: countersinks |
| product group only | Countersink A | csnk | product group: countersinks |
| value plus product group | Countersink B | 1/4 countersink | product group: countersinks, body diameter: 1/4" |
| value plus product group | Countersink B | 0.25 countersink | product group: countersinks, body diameter: 1/4" |
| product group only | Countersink B | csk | product group: countersinks |
| product group only | Countersink B | csnk | product group: countersinks |
| product group only | Countersink A | countersinks | product group: countersinks |
| product group only | Countersink A | countersink | product group: countersinks |
| product group only | Countersink B | countersinks | product group: countersinks |
| product group only | Countersink B | countersink | product group: countersinks |
| value plus product group | Countersink A | 1/4" countersinks | product group: countersinks, body diameter: 1/4" |
| value plus product group | Countersink A | 0.25" countersinks | product group: countersinks, body diameter: 1/4" |
| value plus product group | Countersink A | quarter-inch countersinks | product group: countersinks, body diameter: 1/4" |
| value plus product group | Countersink A | quarter inch countersinks | product group: countersinks, body diameter: 1/4" |
| value plus product group | Countersink A | 1/4" countersink | product group: countersinks, body diameter: 1/4" |
| value plus product group | Countersink A | 0.25" countersink | product group: countersinks, body diameter: 1/4" |
| value plus product group | Countersink A | quarter-inch countersink | product group: countersinks, body diameter: 1/4" |
| value plus product group | Countersink A | quarter inch countersink | product group: countersinks, body diameter: 1/4" |
| value plus product group | Countersink A | 1/4" csk | product group: countersinks, body diameter: 1/4" |
| value plus product group | Countersink A | 1/4 csk | product group: countersinks, body diameter: 1/4" |
| value plus product group | Countersink A | 0.25" csk | product group: countersinks, body diameter: 1/4" |
| value plus product group | Countersink A | 0.25 csk | product group: countersinks, body diameter: 1/4" |
| value plus product group | Countersink A | quarter-inch csk | product group: countersinks, body diameter: 1/4" |
| value plus product group | Countersink A | quarter inch csk | product group: countersinks, body diameter: 1/4" |
| value plus product group | Countersink A | 1/4" csnk | product group: countersinks, body diameter: 1/4" |
| value plus product group | Countersink A | 1/4 csnk | product group: countersinks, body diameter: 1/4" |
| value plus product group | Countersink A | 0.25" csnk | product group: countersinks, body diameter: 1/4" |
| value plus product group | Countersink A | 0.25 csnk | product group: countersinks, body diameter: 1/4" |
| value plus product group | Countersink A | quarter-inch csnk | product group: countersinks, body diameter: 1/4" |
| value plus product group | Countersink A | quarter inch csnk | product group: countersinks, body diameter: 1/4" |
| value plus product group | Countersink B | 1/4" countersinks | product group: countersinks, body diameter: 1/4" |
| value plus product group | Countersink B | 1/4 countersinks | product group: countersinks, body diameter: 1/4" |
| value plus product group | Countersink B | 0.25" countersinks | product group: countersinks, body diameter: 1/4" |
| value plus product group | Countersink B | 0.25 countersinks | product group: countersinks, body diameter: 1/4" |
| value plus product group | Countersink B | quarter-inch countersinks | product group: countersinks, body diameter: 1/4" |
| value plus product group | Countersink B | quarter inch countersinks | product group: countersinks, body diameter: 1/4" |
| value plus product group | Countersink B | 1/4" countersink | product group: countersinks, body diameter: 1/4" |
| value plus product group | Countersink B | 1/4 countersink | product group: countersinks, body diameter: 1/4" |
| value plus product group | Countersink B | 0.25" countersink | product group: countersinks, body diameter: 1/4" |
| value plus product group | Countersink B | 0.25 countersink | product group: countersinks, body diameter: 1/4" |
| value plus product group | Countersink B | quarter-inch countersink | product group: countersinks, body diameter: 1/4" |
| value plus product group | Countersink B | quarter inch countersink | product group: countersinks, body diameter: 1/4" |
| value plus product group | Countersink B | 1/4" csk | product group: countersinks, body diameter: 1/4" |
| value plus product group | Countersink B | 1/4 csk | product group: countersinks, body diameter: 1/4" |
| value plus product group | Countersink B | 0.25" csk | product group: countersinks, body diameter: 1/4" |
| value plus product group | Countersink B | 0.25 csk | product group: countersinks, body diameter: 1/4" |
| value plus product group | Countersink B | quarter-inch csk | product group: countersinks, body diameter: 1/4" |
| value plus product group | Countersink B | quarter-inch csk | product group: countersinks, body diameter: 1/4" |
| value plus product group | Countersink B | 1/4" csnk | product group: countersinks, body diameter: 1/4" |
| value plus product group | Countersink B | 1/4 csnk | product group: countersinks, body diameter: 1/4" |
| value plus product group | Countersink B | 0.25" csnk | product group: countersinks, body diameter: 1/4" |
| value plus product group | Countersink B | 0.25 csnk | product group: countersinks, body diameter: 1/4" |
| value plus product group | Countersink B | quarter-inch csnk | product group: countersinks, body diameter: 1/4" |
| value plus product group | Countersink B | quarter-inch csnk | product group: countersinks, body diameter: 1/4" |

| | | | |
|---|---|---|---|
| value plus product group | Countersink A 160 | 1/4 countersink 162 | 166 product group: countersinks, body diameter: 1/4" |
| value plus product group | Countersink A | 0.25 countersink 164 | product group: countersinks, body diameter: 1/4" |
| product group only | Countersink A | csk | product group: countersinks |
| product group only | Countersink A | csnk | product group: countersinks |
| value plus product group | Countersink B | 1/4 countersink | product group: countersinks, body diameter: 1/4" |
| value plus product group | Countersink B | 0.25 countersink | product group: countersinks, body diameter: 1/4" |
| product group only | Countersink B | csk | product group: countersinks |
| product group only | Countersink B | csnk | product group: countersinks |
| product group only | Countersink A | countersinks | product group: countersinks |
| product group only | Countersink A | countersink | product group: countersinks |
| product group only | Countersink B | countersinks | product group: countersinks |
| product group only | Countersink B | countersink | product group: countersinks |
| value plus product group | Countersink A | 1/4" countersinks | product group: countersinks, body diameter: 1/4" |
| value plus product group | Countersink A | 0.25" countersinks | product group: countersinks, body diameter: 1/4" |
| value plus product group | Countersink A | quarter-inch countersinks | product group: countersinks, body diameter: 1/4" |
| value plus product group | Countersink A | quarter inch countersinks | product group: countersinks, body diameter: 1/4" |
| value plus product group | Countersink A | 1/4" countersink | product group: countersinks, body diameter: 1/4" |
| value plus product group | Countersink A | 0.25" countersink | product group: countersinks, body diameter: 1/4" |
| value plus product group | Countersink A | quarter-inch countersink | product group: countersinks, body diameter: 1/4" |
| value plus product group | Countersink A | quarter inch countersink | product group: countersinks, body diameter: 1/4" |
| value plus product group | Countersink A | 1/4" csk | product group: countersinks, body diameter: 1/4" |
| value plus product group | Countersink A | 1/4 csk | product group: countersinks, body diameter: 1/4" |
| value plus product group | Countersink A | 0.25" csk | product group: countersinks, body diameter: 1/4" |
| value plus product group | Countersink A | 0.25 csk | product group: countersinks, body diameter: 1/4" |
| value plus product group | Countersink A | quarter-inch csk | product group: countersinks, body diameter: 1/4" |
| value plus product group | Countersink A | quarter inch csk | product group: countersinks, body diameter: 1/4" |
| value plus product group | Countersink A | 1/4" csnk | product group: countersinks, body diameter: 1/4" |
| value plus product group | Countersink A | 1/4 csnk | product group: countersinks, body diameter: 1/4" |
| value plus product group | Countersink A | 0.25" csnk | product group: countersinks, body diameter: 1/4" |
| value plus product group | Countersink A | 0.25 csnk | product group: countersinks, body diameter: 1/4" |
| value plus product group | Countersink A | quarter-inch csnk | product group: countersinks, body diameter: 1/4" |
| value plus product group | Countersink A | quarter inch csnk | product group: countersinks, body diameter: 1/4" |
| value plus product group | Countersink B | 1/4" countersinks | product group: countersinks, body diameter: 1/4" |
| value plus product group | Countersink B | 1/4 countersinks | product group: countersinks, body diameter: 1/4" |
| value plus product group | Countersink B | 0.25" countersinks | product group: countersinks, body diameter: 1/4" |
| value plus product group | Countersink B | 0.25 countersinks | product group: countersinks, body diameter: 1/4" |
| value plus product group | Countersink B | quarter-inch countersinks | product group: countersinks, body diameter: 1/4" |
| value plus product group | Countersink B | quarter inch countersinks | product group: countersinks, body diameter: 1/4" |
| value plus product group | Countersink B | 1/4" countersink | product group: countersinks, body diameter: 1/4" |
| value plus product group | Countersink B | 1/4 countersink | product group: countersinks, body diameter: 1/4" |
| value plus product group | Countersink B | 0.25" countersink | product group: countersinks, body diameter: 1/4" |
| value plus product group | Countersink B | 0.25 countersink | product group: countersinks, body diameter: 1/4" |
| value plus product group | Countersink B | quarter-inch countersink | product group: countersinks, body diameter: 1/4" |
| value plus product group | Countersink B | quarter inch countersink | product group: countersinks, body diameter: 1/4" |
| value plus product group | Countersink B | 1/4" csk | product group: countersinks, body diameter: 1/4" |
| value plus product group | Countersink B | 1/4 csk | product group: countersinks, body diameter: 1/4" |
| value plus product group | Countersink B | 0.25" csk | product group: countersinks, body diameter: 1/4" |
| value plus product group | Countersink B | 0.25 csk | product group: countersinks, body diameter: 1/4" |
| value plus product group | Countersink B | quarter-inch csk | product group: countersinks, body diameter: 1/4" |
| value plus product group | Countersink B | quarter inch csk | product group: countersinks, body diameter: 1/4" |
| value plus product group | Countersink B | 1/4" csnk | product group: countersinks, body diameter: 1/4" |
| value plus product group | Countersink B | 1/4 csnk | product group: countersinks, body diameter: 1/4" |
| value plus product group | Countersink B | 0.25" csnk | product group: countersinks, body diameter: 1/4" |
| value plus product group | Countersink B | 0.25 csnk | product group: countersinks, body diameter: 1/4" |
| value plus product group | Countersink B | quarter-inch csnk | product group: countersinks, body diameter: 1/4" |
| value plus product group | Countersink B | quarter inch csnk | product group: countersinks, body diameter: 1/4" |
| value plus product group | Countersink A | fe countersink | product group: countersinks, for use on: iron |
| value plus product group | Countersink B | ti csnk | product group: countersinks, for use on: titanium |
| value plus product group | Countersink B | ni csnk | product group: countersinks, for use on: nickel |
| value plus product group | Countersink B | fe countersink | product group: countersinks, for use on: iron |
| value plus product group | Countersink B | ni countersink | product group: countersinks, for use on: nickel |
| value plus product group | Countersink B | fe csnk | product group: countersinks, for use on: iron |
| value plus product group | Countersink B | ti countersink | product group: countersinks, for use on: titanium |
| value plus product group | Countersink A | fe csnk | product group: countersinks, for use on: iron |
| value plus product group | Countersink B | we csk | product group: countersinks, material: uncoated carbide |
| value plus product group | Countersink B | we countersink | product group: countersinks, material: uncoated carbide |
| value plus product group | Countersink B | fe csk | product group: countersinks, for use on: iron |
| value plus product group | Countersink B | nicsk | product group: countersinks, for use on: nickel |
| value plus product group | Countersink B | ticsk | product group: countersinks, for use on: titanium |
| value plus product group | Countersink B | we csnk | product group: countersinks, material: uncoated carbide |
| value plus product group | Countersink A | fe csk | product group: countersinks, for use on: iron |
| value plus product group | Countersink B | fe countersinks | product group: countersinks, for use on: iron |
| value plus product group | Countersink B | ni countersinks | product group: countersinks, for use on: nickel |
| value plus product group | Countersink B | ti countersinks | product group: countersinks, for use on: titanium |
| value plus product group | Countersink B | tool countersink | product group: countersinks, for use on: tool steel |
| value plus product group | Countersink B | iron countersink | product group: countersinks, for use on: iron |
| value plus product group | Countersink B | we countersinks | product group: countersinks, material: uncoated carbide |
| value plus product group | Countersink A | fe countersinks | product group: countersinks, for use on: iron |
| value plus product group | Countersink A | iron countersink | product group: countersinks, for use on: iron |
| value plus product group | Countersink A | iron csnk | product group: countersinks, for use on: iron |
| value plus product group | Countersink B | steel countersink 180 | product group: countersinks, for use on: steel |
| value plus product group | Countersink B | tool countersinks | product group: countersinks, for use on: tool steel |

FIG. 15b

| 160 | 162 | 164 | 166 |
|---|---|---|---|
| value plus product croup | Countersink B | brass countersink | product croup: countersinks, for use on: brass |
| value plus product croup | Countersink B | iron csk | product croup: countersinks, for use on: iron |
| value plus product croup | Countersink B | tool csk | product croup: countersinks, for use on: tool steel |
| value plus product croup | Countersink B | iron countersinks | product croup: countersinks, for use on: iron |
| value plus product croup | Countersink B | tool csnk | product croup: countersinks, for use on: tool steel |
| value plus product croup | Countersink A | iron csk | product croup: countersinks, for use on: iron |
| value plus product croup | Countersink A | iron countersinks | product croup: countersinks, for use on: iron |
| value plus product croup | Countersink A | steel countersink | product croup: countersinks, for use on: steel |
| value plus product croup | Countersink A | brass countersink | product croup: countersinks, for use on: brass |
| value plus product croup | Countersink A | steel countersink | product croup: countersinks, material: high-speed steel |

| 160 | 162 | 164 | 166 |
|---|---|---|---|
| value plus product group | Countersink A | 1/4 countersink | product group: countersinks, body diameter: 1/4" |
| value plus product group | Countersink A | 0.25 countersink | product group: countersinks, body diameter: 1/4" |
| product group only | Countersink A | csk | product group: countersinks |
| product group only | Countersink A | csnk | product group: countersinks |
| value plus product group | Countersink B | 1/4 countersink | product group: countersinks, body diameter: 1/4" |
| value plus product group | Countersink B | 0.25 countersink | product group: countersinks, body diameter: 1/4" |
| product group only | Countersink B | csk | product group: countersinks |
| product group only | Countersink B | csnk | product group: countersinks |
| product group only | Countersink A | countersinks | product group: countersinks |
| product group only | Countersink A | countersink | product group: countersinks |
| product group only | Countersink B | countersinks | product group: countersinks |
| product group only | Countersink B | countersink | product group: countersinks |
| value plus product group | Countersink A | 1/4" countersinks | product group: countersinks, body diameter: 1/4" |
| value plus product group | Countersink A | 0.25" countersinks | product group: countersinks, body diameter: 1/4" |
| value plus product group | Countersink A | quarter-inch countersinks | product group: countersinks, body diameter: 1/4" |
| value plus product group | Countersink A | quarter inch countersinks | product group: countersinks, body diameter: 1/4" |
| value plus product group | Countersink A | 1/4" countersink | product group: countersinks, body diameter: 1/4" |
| value plus product group | Countersink A | 0.25" countersink | product group: countersinks, body diameter: 1/4" |
| value plus product group | Countersink A | quarter-inch countersink | product group: countersinks, body diameter: 1/4" |
| value plus product group | Countersink A | quarter inch countersink | product group: countersinks, body diameter: 1/4" |
| value plus product group | Countersink A | 1/4" csk | product group: countersinks, body diameter: 1/4" |
| value plus product group | Countersink A | 1/4 csk | product group: countersinks, body diameter: 1/4" |
| value plus product group | Countersink A | 0.25" csk | product group: countersinks, body diameter: 1/4" |
| value plus product group | Countersink A | 0.25 csk | product group: countersinks, body diameter: 1/4" |

| 160 | 162 | 164 | 166 |
|---|---|---|---|
| value plus product group | Countersink A | quarter-inch csk | product group: countersinks, body diameter: 1/4" |
| value plus product group | Countersink A | quarter inch csk | product group: countersinks, body diameter: 1/4" |
| value plus product group | Countersink A | 1/4" csnk | product group: countersinks, body diameter: 1/4" |
| value plus product group | Countersink A | 1/4 csnk | product group: countersinks, body diameter: 1/4" |
| value plus product group | Countersink A | 0.25" csnk | product group: countersinks, body diameter: 1/4" |
| value plus product group | Countersink A | 0.25 csnk | product group: countersinks, body diameter: 1/4" |
| value plus product group | Countersink A | quarter-inch csnk | product group: countersinks, body diameter: 1/4" |
| value plus product group | Countersink A | quarter inch csnk | product group: countersinks, body diameter: 1/4" |
| value plus product group | Countersink B | 1/4" countersinks | product group: countersinks, body diameter: 1/4" |
| value plus product group | Countersink B | 1/4 countersinks | product group: countersinks, body diameter: 1/4" |
| value plus product group | Countersink B | 0.25" countersinks | product group: countersinks, body diameter: 1/4" |
| value plus product group | Countersink B | 0.25 countersinks | product group: countersinks, body diameter: 1/4" |
| value plus product group | Countersink B | quarter-inch countersinks | product group: countersinks, body diameter: 1/4" |
| value plus product group | Countersink B | quarter inch countersinks | product group: countersinks, body diameter: 1/4" |
| value plus product group | Countersink B | 1/4" countersink | product group: countersinks, body diameter: 1/4" |
| value plus product group | Countersink B | 1/4 countersink | product group: countersinks, body diameter: 1/4" |
| value plus product group | Countersink B | 0.25" countersink | product group: countersinks, body diameter: 1/4" |
| value plus product group | Countersink B | 0.25 countersink | product group: countersinks, body diameter: 1/4" |
| value plus product group | Countersink B | quarter-inch countersink | product group: countersinks, body diameter: 1/4" |
| value plus product group | Countersink B | quarter inch countersink | product group: countersinks, body diameter: 1/4" |
| value plus product group | Countersink B | 1/4" csk | product group: countersinks, body diameter: 1/4" |
| value plus product group | Countersink B | 1/4 csk | product group: countersinks, body diameter: 1/4" |
| value plus product group | Countersink B | 0.25" csk | product group: countersinks, body diameter: 1/4" |
| value plus product group | Countersink B | 0.25 csk | product group: countersinks, body diameter: 1/4" |
| value plus product group | Countersink B | quarter-inch csk | product group: countersinks, body diameter: 1/4" |
| value plus product group | Countersink B | quarter inch csk | product group: countersinks, body diameter: 1/4" |
| value plus product group | Countersink B | 1/4" csnk | product group: countersinks, body diameter: 1/4" |
| value plus product group | Countersink B | 1/4 csnk | product group: countersinks, body diameter: 1/4" |
| value plus product group | Countersink B | 0.25" csnk | product group: countersinks, body diameter: 1/4" |
| value plus product group | Countersink B | 0.25 csnk | product group: countersinks, body diameter: 1/4" |
| value plus product group | Countersink B | quarter-inch csnk | product group: countersinks, body diameter: 1/4" |
| value plus product group | Countersink B | quarter inch csnk | product group: countersinks, body diameter: 1/4" |
| value plus product group | Countersink A | fe countersink | product group: countersinks, for use on: iron |
| value plus product group | Countersink B | ti csnk | product group: countersinks, for use on: titanium |
| value plus product group | Countersink B | nicsnk | product group: countersinks, for use on: nickel |
| value plus product group | Countersink B | fe countersink | product group: countersinks, for use on: iron |
| value plus product group | Countersink B | ni countersink | product group: countersinks, for use on: nickel |
| value plus product group | Countersink B | fe csnk | product group: countersinks, for use on: iron |
| value plus product group | Countersink B | ti countersink | product group: countersinks, for use on: titanium |
| value plus product group | Countersink A | fe csnk | product group: countersinks, for use on: iron |
| value plus product group | Countersink B | wccsk | product group: countersinks, material: uncoated carbide |
| value plus product group | Countersink B | we countersink | product group: countersinks, material: uncoated carbide |
| value plus product group | Countersink B | fe csk | product group: countersinks, for use on: iron |
| value plus product group | Countersink B | ni csk | product group: countersinks, for use on: nickel |
| value plus product group | Countersink B | ti csk | product group: countersinks, for use on: titanium |
| value plus product group | Countersink B | we csnk | product group: countersinks, material: uncoated carbide |
| value plus product group | Countersink A | fe csk | product group: countersinks, for use on: iron |
| value plus product group | Countersink B | fe countersinks | product group: countersinks, for use on: iron |
| value plus product group | Countersink B | ni countersinks | product group: countersinks, for use on: nickel |
| value plus product group | Countersink B | ti countersinks | product group: countersinks, for use on: titanium |
| value plus product group | Countersink B | tool countersink | product group: countersinks, for use on: tool steel |
| value plus product group | Countersink B | iron countersink | product group: countersinks, for use on: iron |
| value plus product group | Countersink B | we countersinks | product group: countersinks, material: uncoated carbide |
| value plus product group | Countersink A | fe countersinks | product group: countersinks, for use on: iron |
| value plus product group | Countersink A | iron countersink | product group: countersinks, for use on: iron |
| value plus product group | Countersink A | iron csnk | product group: countersinks, for use on: iron |
| value plus product group | Countersink B | steel countersink | product group: countersinks, for use on: steel |
| value plus product group | Countersink B | tool countersinks | product group: countersinks, for use on: tool steel |
| value plus product group | Countersink B | brass countersink | product group: countersinks, for use on: brass |
| value plus product group | Countersink B | iron csk | product group: countersinks, for use on: iron |
| value plus product group | Countersink B | tool csk | product group: countersinks, for use on: tool steel |
| value plus product group | Countersink B | iron countersinks | product group: countersinks, for use on: iron |
| value plus product group | Countersink B | tool csnk | product group: countersinks, for use on: tool steel |
| value plus product group | Countersink A | iron csk | product group: countersinks, for use on: iron |
| value plus product group | Countersink A | iron countersinks | product group: countersinks, for use on: iron |
| value plus product group | Countersink A | steel countersink | product group: countersinks, for use on: steel |
| value plus product group | Countersink A | brass countersink | product group: countersinks, for use on: brass |
| value plus product group | Countersink A | steel countersink | product group: countersinks, material: high-speed steel |
| value plus product group | Countersink A | steel csk | product group: countersinks, material: high-speed steel |
| value plus product group | Countersink A | brass csk | product group: countersinks, for use on: brass |
| value plus product group | Countersink B | brass csnk | product group: countersinks, for use on: brass |
| value plus product group | Countersink A | steel csnk | product group: countersinks, for use on: steel |
| value plus product group | Countersink A | steel csnk | product group: countersinks, material: high-speed steel |
| value plus product group | Countersink A | steel csk | product group: countersinks, for use on: steel |
| value plus product group | Countersink B | steel csk | product group: countersinks, for use on: steel |
| value plus product group | Countersink A | brass csnk | product group: countersinks, for use on: brass |
| value plus product group | Countersink B | brass csk | product group: countersinks, for use on: brass |
| value plus product group | Countersink B | steel csnk | product group: countersinks, for use on: steel |
| value plus product group | Countersink B | nickel csk | product group: countersinks, for use on: nickel |
| value plus product group | Countersink B | bronze csnk | product group: countersinks, for use on: bronze |
| value plus product group | Countersink B | bronze csk | product group: countersinks, for use on: bronze |
| value plus product group | Countersink B | nickel csnk | product group: countersinks, for use on: nickel |

184

SEARCH ENGINE TRAINING APPARATUS AND METHOD AND SEARCH ENGINE TRAINED USING THE APPARATUS AND METHOD

BACKGROUND OF THE INVENTION

Field of the Invention

The present invention relates generally to an apparatus and method for training a search engine and to a search engine trained using the apparatus and method and, more particularly, to an apparatus and method for generating synthetic search arguments for search engine training and to a search engine trained using synthetic search arguments.

Description of the Related Art

An on-line catalog may be searched by a user to locate a desired product. The user inputs search terms, also referred to as a search argument, that may include a name of the product, a description of the product, or other information relating to the desired product. The user's search argument is provided to a search engine, which processes the search argument in an attempt to identify the product for which the user is searching. The search engine may return a response to the user with information on a product or with information on several products that may or may not be the product for which the user is searching. If the user does not find the desired product in the response, the user may try a different search argument in an effort to locate the desired product, and may receive a further response from the search engine. This may be repeated until the user either locates the desired product or abandons the search.

A search engine that uses artificial intelligence to interpret search arguments has been used for an on-line catalog. The artificial intelligence function of the search engine notes the search arguments that have been input by users and notes the users' reactions to the responses as a way of determining if the response provided the information for which the user was looking. The user reactions include user interactions with the website or app. If the user inputs a further search argument following the search engine response, this likely indicates that the response by the search engine did not include the desired product. This may be interpreted by the search engine as a failure to identify the desired product from the search argument. Each further search argument input by the user while looking for the desired product could be an indication of a failure by the search engine to find the desired product in response to the last prior search argument. Other reactions by the user may also indicate a failure to find the desired product. This information on failed search responses is provided as feedback to the artificial intelligence function of the search engine. The artificial intelligence function may learn that the responses provided are incorrect interpretations of the user search arguments.

On the other hand, if the desired product is identified in the response by the search engine, the user may order the product or take other action that indicates that the desired product was correctly identified in the response. An order for the product by the user may be considered a success by the search engine at having correctly interpreted the search argument. Other indications of success by the search engine could be that the user retrieves product information about the product, that the user saves the product information, or that the user saves a link to the product or forwards the information or the link to another user. The user may request additional product information about the desired product, or may read reviews of the desired product, or may take other actions that indicate that the user has located the desired product. Each of these indications may be treated as a success by the search engine at providing a correct interpretation of the user's search argument. Other reactions by the user may also indicate a successful identification of the desired product. This information on successful search responses is provided as feedback to the artificial intelligence function. The artificial intelligence function may learn that the successful responses are correct interpretations of the user search arguments and may link the search arguments to the desired product.

Where a user who is seeking a desired product has input a first search argument and the response has failed to provide the desired product, the user may input a further search argument which results in a response with a successful identification of the desired product. The artificial intelligence function learns that the user had intended the desired product when entering the first search argument. Not only does the artificial intelligence function link the further (successful) search argument to the desired product, but the first (failed) search argument may be linked to the desired product as well. Multiple first (failed) search arguments may be linked to the desired product where the desired product is ultimately found after a series of failed response. A subsequent user who enters a previously failed search argument may receive a correct response with the desired product as a result of the artificial intelligence function having learned the correct response to that search argument.

If the user undertakes a search for a different product after receiving the response, the user's actions may indicate that the response did include the desired product, that the user has the information needed, and that the user is now searching for a different product. There may be some uncertainty as to whether that response should be considered a success or failure, however, since the user may instead have begun searching for a different product because the user is abandoning the search for the first desired product and is then undertaking a search for a second desired product. This information may be provided as feedback to the artificial intelligence function, which may require other clues as to whether the response should be considered a success or failure. Other user reactions may also provide uncertain feedback to the artificial intelligence function.

The artificial intelligence function may link the user's search arguments to the desired product, both the search argument to which the search engine provided successful responses and the search arguments to which the search engine provided failed responses but which ultimately lead to a successful response. As this process is repeated by other users who are searching for the desired product, the artificial intelligence function builds intelligence, for example in the form of a library or list of search arguments that users have input in searches for the desired product. The search engine learns the various search arguments that users have entered so that the search engine becomes trained to more frequently respond to the searches with information on the desired product. As the number of searches received by the search engine grows, the intelligence may include information on the frequency of use of the different search terms in the search arguments including which search terms are more often used or more likely to be used by users and which are less often and thus less likely. Users searching for a desired product in the catalog may use a variety of search terms to describe the product and may use those terms in various syntax, semantics and pragmatics when constructing a search argument. The search engine may also be used to search for other information, such as order information, or customer information. The search engine receiving the search request must be trained to understand the intent of the user from the variations in the search arguments in order to respond with the desired product or other information.

The artificial intelligence learns to provide correct responses for multiple different products and information as users input search terms for the different products and information and the feedback is provided. The broader the range of products searched by users, the broader the training of the artificial intelligence function.

The search engine may use other information, such as the domain from which the user is conducting the search, the company from which the search is conducted, the type of industry from which the search is made, this user's prior search history and/or order history, the search and order history of other users at the same company or at the same domain or in the same industry, or other information, in preparing the response to the search argument, all of which may also be incorporated into the intelligence. For example, the search engine may learn from the user's domain or company that the user is employed in the food service industry so that the responses only include food-safe products. The search engine may learn that a user may search for the same products or similar products to those that appear in the user's prior search or order history so that the responses to this user should include the same or similar products as in the prior searches or orders.

As the training of the search engine continues, the search engine expands the breadth of the search arguments that are linked to the desired products and learns variations in search terms, including miss-spellings, alternate terms, abbreviations, and other variations that users input as search arguments for the desired product. Each learned variation increases the likelihood of a successful response by the search engine to search arguments input in the future.

If another user submits a search argument that is the same or similar to a previously submitted search argument, even if it is similar to a previously unsuccessful search argument, the artificial intelligence function may have learned to match the search argument with the desired product. Using the link between the previous search argument and the desired product that was established when prior users located the desired product, the artificial intelligence function may respond to the current user with the desired product. The more user inputs that the artificial intelligence function receives for the desired product, the larger the library or list of linked search arguments becomes. The user inputs of search arguments and the user reactions to the responses by the search engine trains the search engine so that the search engine is increasingly more likely to respond with the desired product sooner in the search process. Many users may receive an identification of the desired product in the first response from the search engine once the search engine has been trained to recognize a wide variety of possible search arguments for the desired products.

A search engine that uses artificial intelligence may rapidly become trained to locate products that are searched for frequently. However, the search engine does not become trained in products that are searched for infrequently. For instance, a product that is searched for by users only once a month or even once or twice per year does not receive a sufficient number and range of search arguments and results to train the search engine on that product. A user who is seeking the infrequently searched product may have a different search experience than a user who is seeking a frequently searched product. The response to the user's search for the infrequently searched product may not include the desired product and it may be necessary for the user to repeat the search effort several times with iterations of search arguments before the response includes the desired product. The user may even abandon the search for the product before locating it, resulting in the search engine receiving no information linking the attempted search arguments to the desired product and thus no training of the search engine for the failed search. The user may be unsatisfied with the search efforts and no sale of the product to this user is made.

Infrequently searched products may differ from the frequently searched products in only one or a few characteristics. For example, countersink bit having a cutting angle of 82 degrees may be searched frequently but a countersink bit having a cutting angle of 60 degrees may be searched infrequently. Another example is a fastener formed of one material may be frequently searched but the same fastener of another material may be infrequently searched. The user seeking the countersink at the less frequently search cutting angle or the fastener of the less frequently searched material may receive a response that does not show the desired product, and may even receive search responses showing the more frequently searched product, but not the desired product. The users may conclude that their desired products are not available. This conclusion may be reinforced for the user if the user has searched for other products which the search engine has correctly identified in responses, but for a particular product the search results fail to identify the desired product. As users become convinced that the particular products are not available, fewer users search for those products, so that the search engine receives even less training on those products.

Other differences in products, such as the same product but with a different finish, of a different size, of a different dimension or having a different feature may be infrequently searched so that the search engine remains untrained in the products that have the infrequently searched finish, size, dimension or feature. The result is that the training of the search engine is unevenly applied across the product lines, so that users receive uneven results.

When new products are introduced to the product catalog, the search engine is untrained on those products. If the search engine is updated or replaced, the search engine is untrained and may require training from scratch.

SUMMARY

The present invention provides an apparatus and method for training a search engine, a search engine trained using the apparatus and method, an apparatus and method for generating synthetic search arguments for search engine training, and a search engine trained using synthetic search arguments.

An apparatus and method generates synthetic search arguments and provides the synthetic search arguments to a search engine. The synthetic search arguments are processed by the artificial intelligence function of the search engine to train the search engine. Training of the search engine using the synthetic search arguments may be used in place of or to supplement training by user inputs.

The search engine may be trained to respond to search arguments by identifying products in a product catalog. The search engine may be trained to respond to search arguments seeking other information. For example, synthetic search arguments may train the search engine to respond to requests for an order history, an account statement, user information, product information, company information, or other information.

BRIEF DESCRIPTION OF THE DRAWINGS

FIG. 1 is a functional block diagram of a search engine and a system for training the search engine;

FIG. 2 is a block diagram showing a user input to a search engine being translated into canonical language by machine translation;

FIG. 5 is a block diagram showing data from the database being ingested and converted into candidate synthetic search arguments;

FIG. 6 is a functional block diagram showing candidate synthetic search arguments being processed into relevant descriptors;

FIGS. 11a, 11b and 11c show a listing of candidate synthetic search arguments for a two product example;

FIG. 12 shows a listing of candidate synthetic search arguments that match search arguments in the historical data;

FIG. 13 shows a listing of candidate synthetic search arguments that are similar to historical search arguments according to a first pattern similarity;

FIG. 14 shows a listing of candidate synthetic search arguments that are similar to historical search arguments according to a second pattern similarity;

FIGS. 15a and 15b shows a listing of candidate synthetic search arguments that are similar to historical search arguments according to a textual similarity and that have exceed a threshold; and FIGS. 16a and 16b shows a listing of candidate synthetic search arguments that are similar to historical search arguments according to natural language processing.

DETAILED DESCRIPTION OF THE PREFERRED EMBODIMENTS

Figure 3:
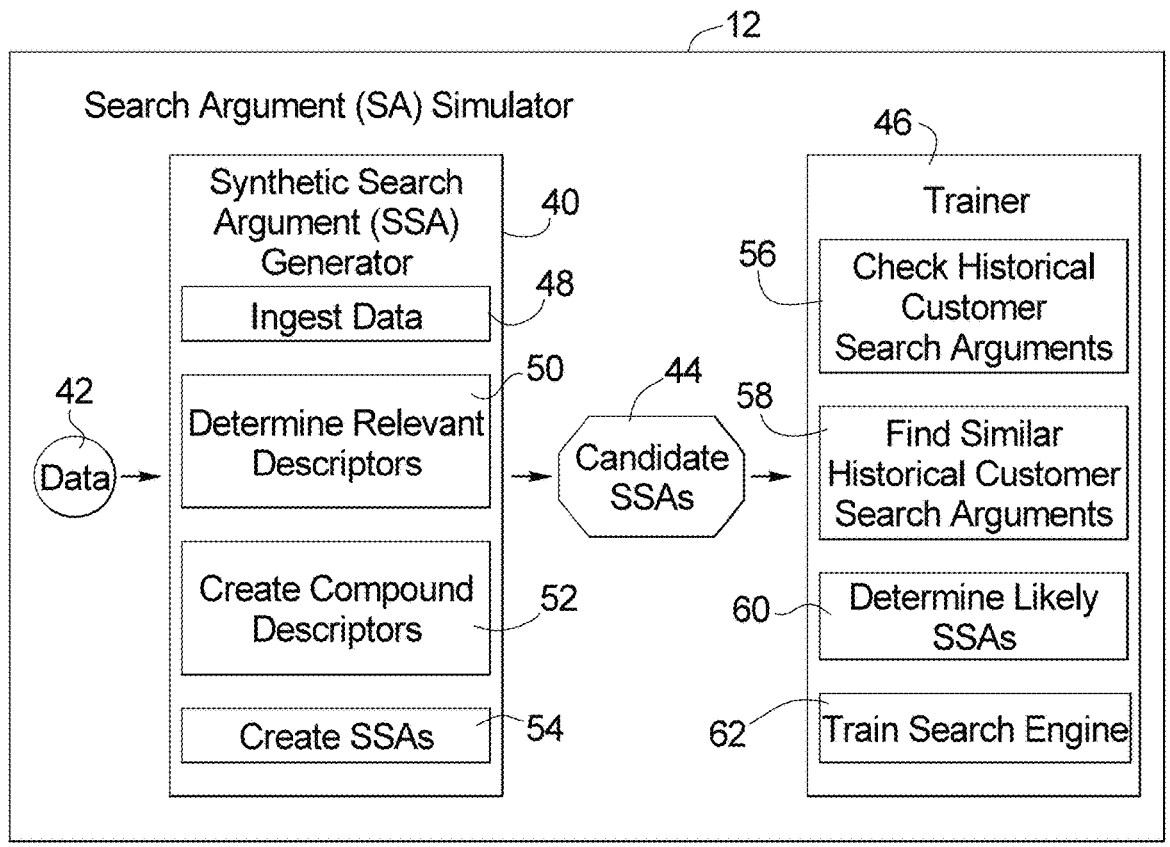
FIG. 3 is a functional block diagram of a search argument simulator.

In FIG. 1 is a search engine 10 that requires training. The search engine 10 uses artificial intelligence to generate responses to search arguments that are input into the search engine 10. The search engine 10 requires training of the artificial intelligence function in order to interpret the search arguments and to respond with the desired information. The desired information may be information on a product, service, or other information, and may be referred to as the target or target information. Training of the search engine 10 is performed by a search argument simulator 12. The search argument simulator 12 generates synthetic search arguments and presents the synthetic search arguments to the search engine 10 via a connection 14. The search engine 10 interprets the synthetic search arguments and generates responses. The search engine 10 builds a model of inputs and responses as it is trained. Training continues until the search engine successfully interprets the synthetic search arguments and responds with the desired information, in other words the target information.

Once trained, the search engine has a model of industrial language used for the machine translation that it may use to generate responses to user search arguments. The search engine 10 may be connected to receive search arguments from users once the search engine 10 has been trained. The users may provide search arguments to the search engine 10 via a website on a computer 11, via an app on a smart device 13, or via another interface. The search engine 10 may have already been connected to receive search arguments from users and may require further training before being reconnected to receive user search arguments.

During training, the search argument simulator 12 may test the search engine's ability to correctly respond to the search argument and may correct the search engine 10 if the response is wrong. The training continues until the search engine 10 reliably generates the correct response, whereupon the search engine 10 may be deemed to be trained and ready to receive user search arguments. Alternatively, the search argument simulator 12 may provide both the search argument and the target being sought by the search argument to the search engine 10 during training. A list of synthetic search arguments and the target product, service or information for each may be provided to the search engine during training. Training of the search engine may be broken into units of work, where each unit of work provides training on a family of products or information for example. The unit of work may involve training on new products or training on products for which the search engine has been unsuccessful at providing correct responses. Other units of work may be defined as needed.

An evaluator 16 monitors the search engine 10 via a connection 18 to determine if the responses show that the search engine has successfully interpreted the search arguments. The evaluator 16 may monitor the responses to the synthetic search arguments generated by the search argument simulator 10, it may monitor the responses to search arguments that are input by users, or it may monitor both synthetic and user search arguments. For example, the evaluator 16 may monitor each query by users to determine whether or not the user completed a successful search for a desired product.

The evaluator 16 may include an anomaly detection system that looks for patterns of unsuccessful queries using clustering and classification techniques. The evaluator 16 transmits its findings to the search argument simulator 10 via a connection 20. The search argument simulator 12 may adjust future synthetic search arguments to be sent to the search engine 10 to improve future training as a result of the information detected by the evaluator 16. If the search argument simulator 12 is found to have a model of the industrial language that is flawed in some way, the search argument simulator 12 creates new mappings or links and calls the search engine 10 back for additional training.

The search engine 10 of an exemplary embodiment utilizes machine translation concepts to interpret, or translate, a user's needs as expressed in a user-input search argument into terms that the system uses to identify the desired product or information. The machine translation task may be considered as translating the user language into industrial language or canonical language. Search arguments input by users may describe the desired product or information using a wide variety of different terms, including using abbreviations, incomplete values, spelling errors, and implied information, which are interpreted by the search engine 10. The search engine 10 responds by identifying one or more products or information based on the interpretation. The artificial intelligence of the translation function becomes trained to more frequently respond with the desired product or information via repeated inputs of user search arguments and feedback from the user as to whether the responses include the desired product or information.

The search argument simulator 12 generates synthetic search arguments having characteristics of user search arguments, including use of a wide variety of different terms, abbreviations, incomplete values, spelling errors, and implied information and by providing feedback as to whether the responses identify the correct product or information. By providing synthetic search arguments that simulate the variety of different search arguments that users might present when searching for a desired product, the search engine 10 becomes trained to interpret or translate the search arguments as the desired product without requiring that the users perform the training of the search engine. The search engine 10 develops a translation model of industrial language that is used to provide the desired responses to search arguments.

To illustrate the types of search arguments that users present to a search engine, consider the terms that have been used by users who are looking for a countersink, also known as a countersink bit, for use on a drill, drill press or other tool and which is used to cut into material to form a bevel around a bore in a workpiece or to enlarge a hole. The user may refer to the product using the noun "countersink," but other users refer to is using the plural form of the noun, "countersinks." The search term may be abbreviated by the user as "csink" or as "csk" or the user may use other common abbreviations. Users may misspell the search terms when entering the terms into the search engine. Adding the variations in the noun, the misspellings, abbreviations and variants, experience has shown that users have entered over 400 distinct words when searching for a countersink bit.

If the user seeks to describe the part of the countersink that cuts into the material, they may use terms such as "tip," "head" or "body" for that part. The users may include in the search argument a description of the material that the countersink is made from, such as "carbide" or "cobalt steel," and may describe the finish of the countersink, such as "black oxide" or "TiN." The users may describe the size of the countersink using numbers in either a fractional or decimal format. For decimal format input, the users may include leading zeros or vary the number of significant digits. For example, a measurement of "0.5" may be input as "0.5" by some users, and a measurement of "0.75" may be entered as "0.750" by some users. Units of measure may be expressed in different ways. A measurement in inches may be entered by the user as "inch" or "in." or the user may leave the period off the abbreviation so that "in" indicates a measurement in inches. A measurement of inches may also be indicated using a double quote ("). Each of these entries may be misspelled or mistyped by the user when entering a search argument. Synthetic search arguments prepared for training the search engine may include variations such as these.

Users may enter descriptive terms in different ways. A user may enter "82 degree angle countersink for use on wood." Another user may search for the same part by entering "csk 82 wood," which implies information and uses only keywords. The search engine must interpret the semantics, syntax and pragmatics of the search argument. An example of an incorrect interpretation of the second search argument is that the user is looking for wood having the characteristics of csk and 82, or that csk 82 is a compound idea that describes a single property instead of two different properties. In order to provide a response that includes the desired part or information, the search engine should be trained to correctly interpret the different search arguments. Synthetic search arguments are used to train the search engine to distinguish terms and compound ideas in order to find the correct interpretation of the search argument.

The search engine 10 should also be trained to understand that the same term may play different roles in the search argument. A user who enters "steel countersink" is searching for a countersink for enlarging a hole in steel. A user who enters "steel pin" is searching for a pin made of steel. The search engine should understand that the word "steel" followed by a descriptor can have different meanings, for example as either the material on which the product is used or the material of which the product is made. The machine translation function may be trained to understand the exceptions and nuances of user language in order to provide a correct interpretation.

FIG. 2 shows some of the steps that may be carried out by a search engine 10 to translate a search argument 22 into standardized or canonical language 24. The search argument 22 may be input by a user or may be a synthetic search argument generated by the present system for the purposes of training. The search argument 22 is input to a translation function 26, which may be part of the search engine 10 or may be provided by a separate component. In performing the translation function, any of the following functions may be performed, including expand any abbreviations 28, correct any misspellings 30, complete any partial values 32, group concepts 34, and infer any implied information 36.

In an example, the user or the search argument simulator has input the search argument "csk 82 stainless stel." The translation function 26 operates by expanding the abbreviation "csk" to the standard term "countersink" in the expand abbreviations function 28. The correct misspelling function 30 operates to change "stel" to "steel." The compete partial values function 32 operates to change "82" to "82°." The group concepts function 34 operates to form a first group "countersink," a second group "stainless steel," and a third group "82°." The infer implied information function 36 operates to infer that the "stainless steel" concept refers to a countersink for use on stainless steel, while the "82°" concept refers to the cutting angle of the countersink. The trained translation function 26 has interpreted the search argument as requesting a "countersink angle of 82° for use on stainless steel in the product family of countersinks." Training is required to reach this result.

It is important in training the search engine 10 that the machine learning algorithm be provided with a set of examples that map the user language into the standardized or canonical language describing the part. The standardized language may also be termed industrial language or catalog language, or even company language.

Historical interactions between users and search engines may be used in developing synthetic search arguments for training. In a historical example, a user has input the search argument "hss countersink" into the search engine. The initial response by the search engine may include all countersinks, and the search engine may ask for input of characteristics to narrow the search. The user may input high-speed steel as the material and may also input the additional information of 90° as the cutting angle. The additional user input could be used to train the search engine to understand the meaning of "hss." The machine translation function could be trained to interpret "hss" as "high-speed steel" based on the first additional input but the second additional input in this example may teach the search engine that the search term "hss" also relates to the product characteristic of a 90° cutting angle. Historical examples alone may not lead to accurate training of the search engine. Synthetic search arguments should be configured to train the search engine to link between search terms and their correct meanings without use of possible misleading information.

Another limitation of using historical interactions for training is that users enter a few common search terms very frequently while other search terms are used only infrequently in the record of historical searches. Users may frequently search for "4-flute countersinks" but may not search for the similar product, a "3-flute countersink" within a given time period. A search engine trained using this historical record would be untrained in searching for 3-flute countersinks. Synthetic search arguments are generated from gathered, distilled, and published information about the products, including from the product catalogs and other sources. The products searched and the terms used in the synthetic search arguments are broader than the historical record and may include all of the products available, even if they have not been previously searched. The synthetic search arguments may train the search engine on products that are infrequently searched by users and may use terms that are absent from or rare in the historical record.

Historical examples are examined for patterns in user search arguments in order to generate likely synthetic search arguments. In a historical record of users seeking countersinks coated in black oxide the users have searched for "black oxide countersinks," "black oxide countersink," "black oxide csk," "black csk," "blackoxide countersinks," "vlack oxide countersinks," and "countersincs." The historical record shows that users change plural nouns to singular, abbreviate words, eliminate descriptive terms, eliminate spaces between words, hit a wrong key adjacent to the correct key, or spell words phonetically. These patterns are used to generate synthetic search arguments that are structured like those that users may input.

Historical user searches have shown that users may construct a search argument with the noun at the beginning or the end. Users may input either "black oxide countersinks" or "countersinks black oxide" so these terms may be provided as likely synthetic search arguments. However, the term "black oxide" has a semantic relationship that is broken by the search argument "black countersink oxide." To generate synthetic search arguments, the atomic unit of meaning of phrases, such as "black oxide," are considered to avoid nonsensical search arguments. Syntax, semantics, and pragmatics gained from institutional knowledge may be used to generate realistic or likely synthetic search arguments.

The search argument simulator 12 generates artificial scenarios using product information, historical customer behavior and rules about syntax, semantics and pragmatics in order to train the search engine 10.

In FIG. 3, the search argument simulator 12 includes a synthetic search argument generator 40 that receives data from a data source 42 and generates candidate synthetic search arguments 44. The candidate synthetic search arguments 44 are forwarded to a trainer 46. The trainer 46 determines which of the candidate synthetic search arguments 44 should be provided to the search engine 10 and forwards the synthetic search arguments 44 that have been approved by the trainer 46 to the search engine 10 via the connection 14, as shown in FIG. 1. The synthetic search argument generator 40 operates to ingest the data 48 from the data source 42, from the ingested data determines relevant descriptors 50 for the product or information, from the relevant descriptors creates compound descriptors 52 for the product or information, and from the relevant descriptors and the compound descriptors creates synthetic search arguments 54 for the product or information. The output of each block in the synthetic search argument generator 40 may feed the next block. The synthetic search argument generator 40 uses the data 42 to generate a collection of synthetic search arguments that may be indistinguishable from search arguments input by users. Just as a user knows the product or class of product they intend to indicate when entering their search argument, the synthetic search argument generator 40 identifies a product or class of products that will fulfill the search argument and toward which the synthetic search arguments are directed. In other words, the synthetic search argument generator 40 generates synthetic search arguments 44 that are configured for locating particular products or information, or for locating particular classes of products or information, that will be counted as a correct response by the search engine.

The synthetic search argument generator 40 may generate candidate synthetic search arguments 44 that are likely to be input by a user and may also generate candidate synthetic search arguments that are unlikely to be input by a user. For example, the semantic relationship of compound terms may be broken by some candidate synthetic search arguments. The trainer 46 operates to check candidate synthetic search arguments 44 against historical customer or user search arguments 56 and approves the synthetic search arguments that are the same as those found in the historical search arguments. The trainer 46 operates to find candidate synthetic search arguments that are similar to historical customer search arguments 58. Although not identical, the trainer 46 approves the candidate synthetic search arguments 44 that are similar to historical search arguments. Examples of similarity determinations are provided later in this specification. At block 60, the trainer 46 operates to determine which of the candidate synthetic search arguments 44 are likely to be input by a user and approves those that are determined to be likely synthetic search arguments. The trainer 46 uses the approved synthetic search arguments that are collected from the blocks 56, 58 and 60 to train the search engine 62. The blocks 56, 58 and 60 are not dependent on one another for input and may operate independently in any order. The trainer 46 may use any one of the blocks 56, 58 or 60 to generate the approved search argument list, or may use any of the blocks in any combination. The search engine 10 becomes trained using synthetic search arguments that it is likely to encounter from users, rather than being trained using synthetic search arguments that are unlikely to be input by a user. The trainer 46 chooses the set of synthetic search arguments that best represent the types of search arguments that users would input to the search engine 10 and provides those to the search engine for training.

Figure 4:
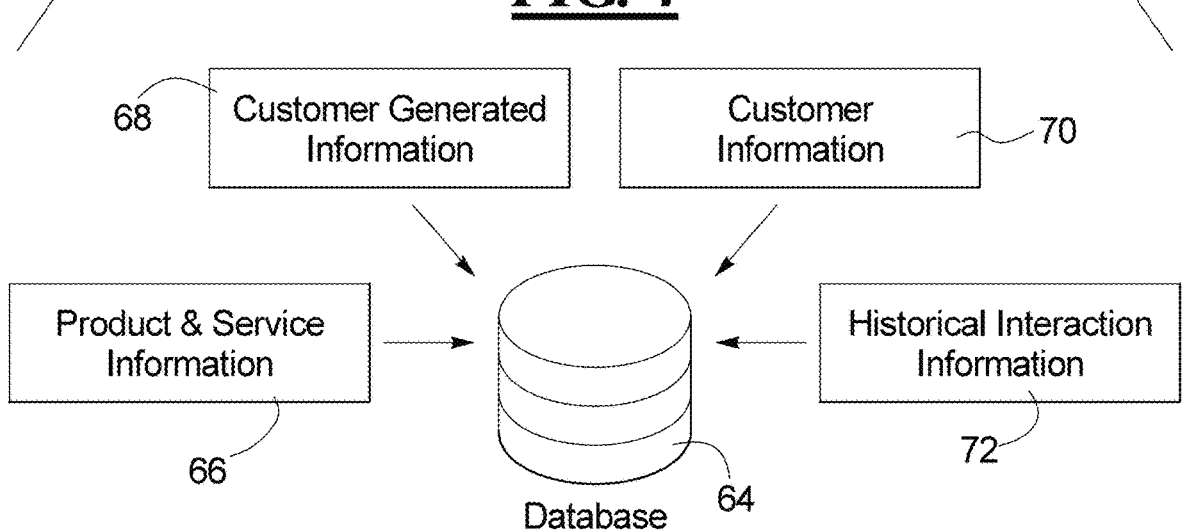
FIG. 4 is a block diagram showing sources of data for use in generating synthetic search arguments being provided to a database.

The data source 42 is shown in FIG. 3 is shown in further detail in FIG. 4, wherein the various types of data that may be available from the data source 42 for use by the search argument simulator 12 are shown. The data may be stored in a database 64 from which data is drawn for generating the synthetic search arguments or to determine if the synthetic search argument candidate is likely to be used by a user. In the example, the database 64 is provided with product and service information and other information 66 of the products or services or other information that the users may search for, customer or user generated information 68, customer or user information 70, and historical interaction information 72.

The product or service information or other information 66 may include attributes, specifications, features and benefits of every product or service offered via the on-line site or otherwise available. For a site that provide information to users, such as financial information, order history information, payment information, or other information, the attributes, values, specifications, features and benefits of such information may be provided for training the search engine to respond to search requests for the information. The offerings are organized into taxonomies and ontologies to define relationships between the products or services. The product descriptions include descriptions that the company anticipates the users may use to describe the products and services or other information. The product and service information is stored in a query-able form for multiple purposes.

The customer or user generated information 68 may include part numbers that are internal to the user and purchase orders for products entered by users. Correspondence with users that may be received by email, via telephone calls, or telefax communications may also be stored as user generated information. Transcripts, recordings or other records of telephone calls or notes from customer service personnel, sales representatives, or other company representatives relating to telephone calls with the users may be stored as user generated information. The content of the stored user generated information may be structured as a result of having been entered via a form by the user or company representative, although much of the customer or user generated information is unstructured.

The customer or user information 70 may include information about the customer or user, such as firmographic information about the organization that the user works for, the industry in which the organization operates, the locations and sizes of the facilities operated by the organization, and the number of people employed by the organization. For example, knowing that the user works in the food service industry may change the response generated by the search engine to a user query to include food-safe products.

The historical interaction information 72 may include interactions that users have had with a search engine through a website and/or via an app on a mobile device. The historical interaction information 72 may include search arguments that users have entered, information on links that were selected by users, information on images inspected by users, information on files downloaded by users, information on pages printed by users, and information on products ordered by users via the website, the app or otherwise. The user's interactions with the entity's digital presence are stored for use in generating likely synthetic search arguments. Stored user interactions may be organized into a graph structure that may reconstruct the user's interactions with the website or app.

The ingesting of the data as shown in element 48 in FIG. 3 is shown in further detail in FIG. 5, wherein the information stored in the database 64 is ingested at 74 to generate candidate synthetic search argument information at 76. The information stored in the database 64 has been collected from various sources and may be structured or unstructured. The ingestion 74 of the data includes retrieving the data for a unit of work that may be relevant to that unit of work and preparing the data for evaluation. A unit of work may be the work involves preparing synthetic search arguments for training the search engine 10 on a product or service, on a family of products or services, or other grouping of products, services or information. For example, performing the steps to train the search engine to respond to searches for countersinks may be considered a unit of work. The data is prepared by cleansing, parsing and structuring the data into a data format for use in generating the synthetic search arguments. The result of the ingesting process 74 may include a collection of candidate synthetic search argument information 76.

The determination of relevant descriptors as shown in FIG. 3 at element 50 is shown in further detail in FIG. 6, wherein a determination is made as to whether the candidate synthetic search argument information 76 is relevant to the product or information to be trained. Only information that is relevant to the unit of work is used, even if the information is true. For example, if the unit of work includes tubing, the information that "ID" is an abbreviation for "inner diameter" is true and relevant to searches for tubing. This information is kept for use in building synthetic search arguments. The information that "ID" is an abbreviation for "Idaho" is true, but not relevant to searches for tubing. The non-relevant information is discarded, or culled. In FIG. 6, the candidate synthetic search argument information 76 is split into structured information 78 and unstructured information 80. As noted above, much of the user generated information 68 is unstructured, whereas the product or service information 66 primarily includes structured information. The structured information is subjected to rules 82 which determine if the information is relevant to the item of work. The structured information may include the definition of the abbreviation "ID" for example. Relevant information, such as the link between "ID" and "inner diameter" is forwarded at 84 while structured information determined to be irrelevant, such as the link between "ID" and "Idaho," is discarded at 86. The relevant information 84 is provided to a tokenize function 88.

The process for unstructured information 80 differs from that for structured information. User generated information may include the user's internal part numbers, or instructions to the user's receiving department upon receiving the order, for example. The user's internal part number for the product might be relevant to training the search engine, but the instructions for the receiving department are not. The unstructured information 80 is subjected to rules 90 as well as to machine learning (ML) models 92 to determine if it is relevant 94 and should be kept or if it should be discarded as irrelevant 96. The machine learning models may include linguistic rules, machine language sentiment analysis, and machine learning classification. The relevant unstructured information 94 is also provided to the tokenize function 88.

The tokenize function 88 deconstructs the information into descriptors that include atomic units of meaning, which may be a single word or a short phrase. The descriptors include metadata about each descriptor that describe the nature of the descriptor. Once the relevant information 84 and 94 is tokenized, it is added to a relevant descriptors collection at 98. The relevant descriptors collection 98 that is output by the process is a collection of descriptors that will serve as building blocks for assembling synthetic search arguments.

Figure 7:
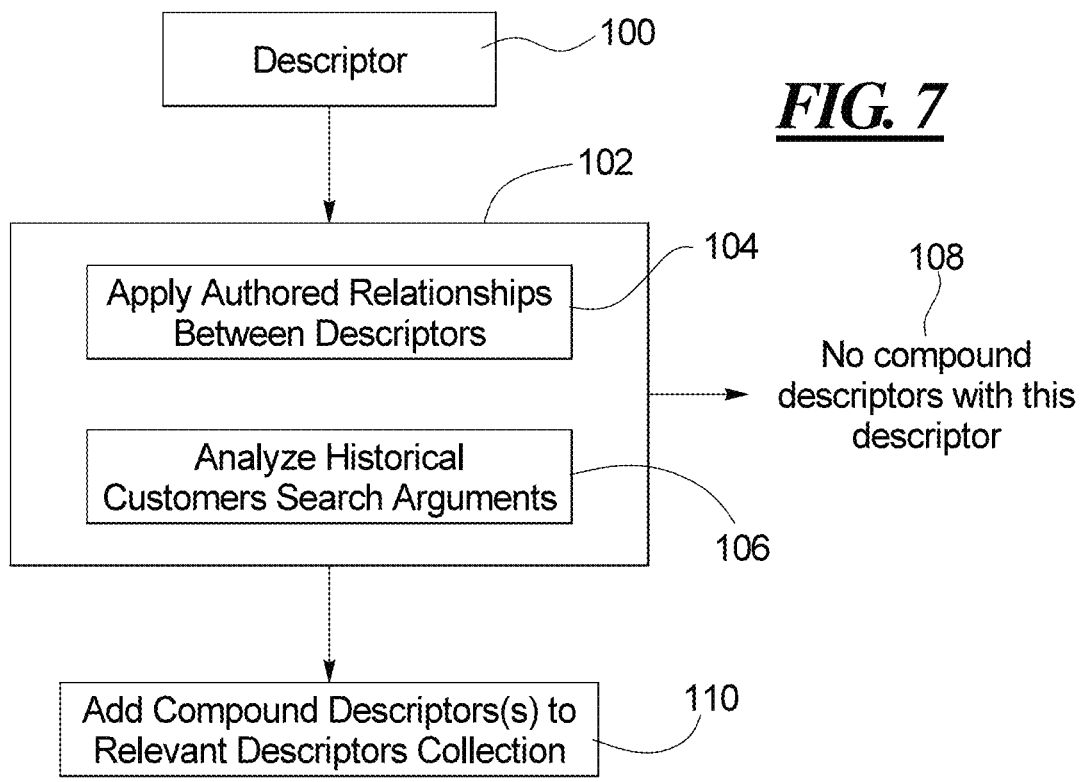
FIG. 7 is a functional block diagram showing descriptors being converted into compound descriptors.

Proceeding to FIG. 7, descriptors 100 from the relevant descriptors collection 98 are assembled into compound descriptors, which is also shown in element 52 in FIG. 3. The descriptors 100 are analyzed in a compounding function 102. Authored relationships between descriptors 104 are applied at 104. The authored relationships 104 may include product descriptions from a catalog or other information by the entity offering the product, service or information. Authored relationships 104 may include word relationships that relate certain industrial language or colloquial language to language that describes or defines products or services. The authored relationships 104 may include authored synonyms. The compounding function 102 may also include an analysis of historical customer or user search arguments 106. The authored relationships 104 and historical arguments 106 are examined for evidence that the descriptor is used with one or more other descriptors to create new descriptors having distinct meanings. If the descriptors are used as a compound term, the search engine 10 should be trained on the compound term. If no relevant compound descriptors are found for the descriptor being examined, no additional output is stored, as indicated at 108. Once relevant compound descriptors are identified, the relevant compound descriptors are added to the relevant descriptors collection at 110.

Examples of compounding of descriptors includes "hardened" and "steel." The terms may be used independently in search arguments, for example, as "hardened washer" or "steel foil" and so are stored as independent descriptors for constructing search arguments. Based on historical searches performed by users, the terms also appear as a compound descriptor "hardened steel." For example, a user may have searched for a "hardened steel padlock" or a "hardened steel band saw blade." The phrase "hardened steel" has a separate meaning from the terms used separately and so is added as a compound descriptor to the collection of relevant descriptors 108 that are used to manufacture candidate synthetic search arguments.

The collection of relevant descriptors 110 are building blocks that the search argument simulator will combine to create phrases that describe a product or service. The descriptors are each provided with metadata that identifies the nature of the descriptor. The descriptors are combined using a list of patterns and rules in order to generate the synthetic search arguments. The patterns and rules for combining the descriptors may be the same for all the units of work, or the list of patterns and rules may be different for the different units of work, for example, the patterns and rules may be different for each product, for each class of product, or for other distinctions.

Figure 8:
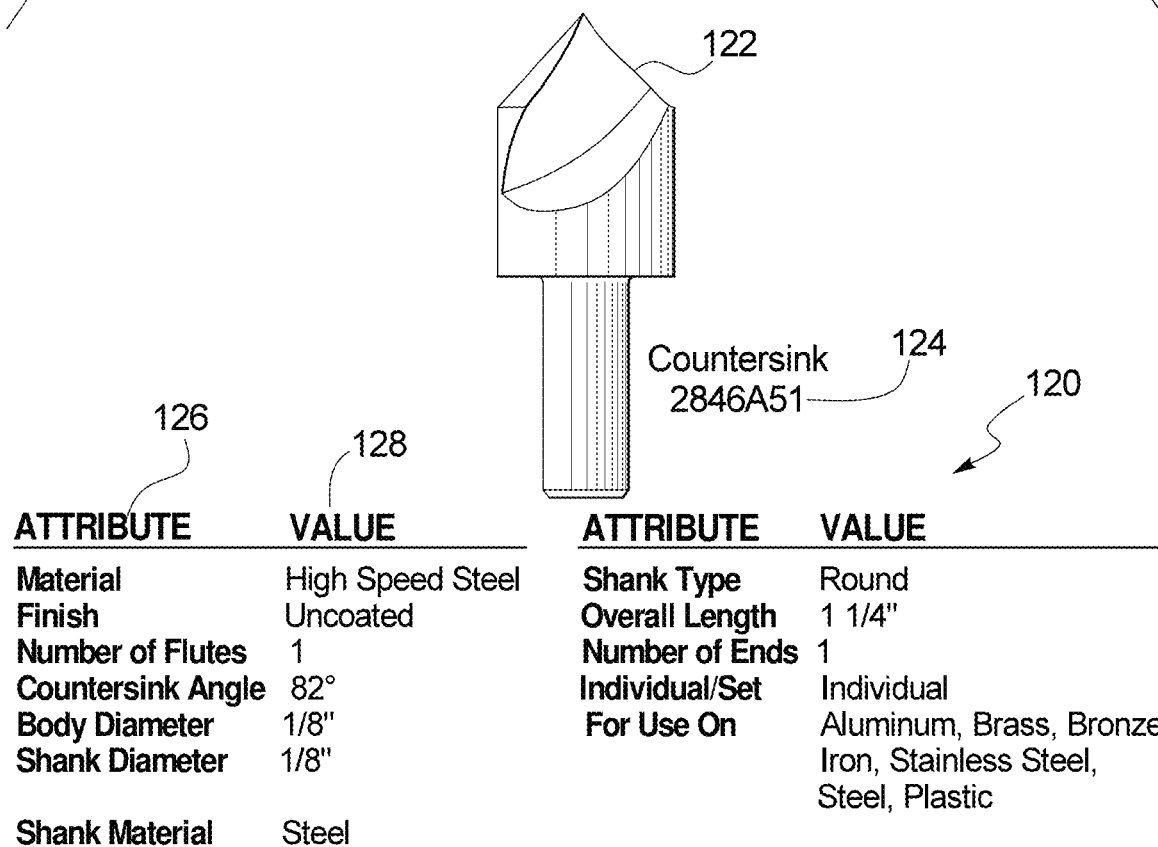
FIG. 8 is a product information sheet for an example of a product on which the search engine is to be trained.

In FIG. 8 is shown a data sheet 120 of a product on which the search engine 10 is to be trained. The data sheet 120 includes an image 122 of the product, here a countersink or countersink bit for use on a drill, drill press or other tool which is used to cut a bevel around a bore in a workpiece, a part number 124 of the product, a list of attributes 126, and a list of values 128 that correspond to each of the attributes 126. The data sheet 120 may include information available in a product catalog or from another source. To generate synthetic search arguments for training the search engine to recognize the product from user search arguments, each descriptor of the product is assigned a metadata identifier, wherein the metadata identifiers are selected from "product," "attribute," and "value" for this product. In the example of training the search engine 10 to recognize search arguments for the countersink, the example will limit the discussion to the attributes of being made of high-speed steel, having a diameter of ⅛", having a countersink angle of 82°, and for use on aluminum, brass, bronze, iron, stainless steel, steel and plastic. Other attributes of the product are not mentioned here for the sake of brevity. The product descriptors and metadata for the example may include "csink (product)" and "csk (product)," where "csink" and "csk" are descriptors and "(product)" is the metadata associated with those descriptors. Other descriptors for the example product may include "material (attribute)," "hss (value)," "high-speed steel (value)," "countersink angle (attribute)," "82° (value)," "82 deg (value)," "82 (value)," "82 degree (value)," "body diameter (attribute)," "body (attribute)," "⅛" (value)," "for use on (attribute)," "aluminum (value)," "brass (value)," "bronze (value),"iron (value)," stainless steel (value)," "steel (value)," and "plastic (value)." This is only a brief example of the many descriptors with metadata that may be provided in the collection of descriptors and metadata for the example product. Many other descriptors, each with metadata, would be produced in a collection for training on other products or other information.

Patterns of descriptors to be created are defined. The patterns are defined by the metadata. In the example, some patterns may include "(product)," "(product)(value)," "(value)(product)," "(product)(value)(attribute)," "(value)(attribute)(product)," "(product)(value 1)(value 2)," and "(value) (attribute)." Many more patterns are possible and are used to generate the synthetic search arguments for the product.

The rules that may be applied include semantic, syntax and pragmatic rules for generating the synthetic search arguments. Examples of some rules include, "do not use the same word more than once consecutively in a synthetic search argument" and "add a space between a value and a unit of measure."

The descriptors, patterns, and rules are applied to generate a list of candidate synthetic search arguments, as shown at element 44 in FIG. 3. Some examples of candidate synthetic search arguments for the countersink example that are generated from just the product name, attribute of angle, and value of 82° include "countersinks," "82° csk," "csink 82 degree," and "82 angle countersink." Many more synthetic search arguments are generated just from these metadata elements. Only a few are mentioned here for the sake of brevity. A very large library of candidate synthetic search arguments 44 is generated by inputting all of the descriptors to all of the patterns and applying all of the rules, and that is just for this one product.

The trainer 46 of FIG. 3 may select a set of examples for training the search engine from the candidate synthetic search arguments 44 that have been generated. The examples may be selected as being those that are more helpful than others for teaching the search engine 10. While each candidate synthetic search argument that has been generated by selecting certain synthetic search arguments from the candidates may be indistinguishable from a search argument that may be submitted by a user, the search engine may be trained on the different types of search arguments that may be encountered from users without requiring training on every possible search argument. The candidate synthetic search arguments are scored. The candidates that have the higher scores are selected for use in training the search engine 10.

Figure 9:
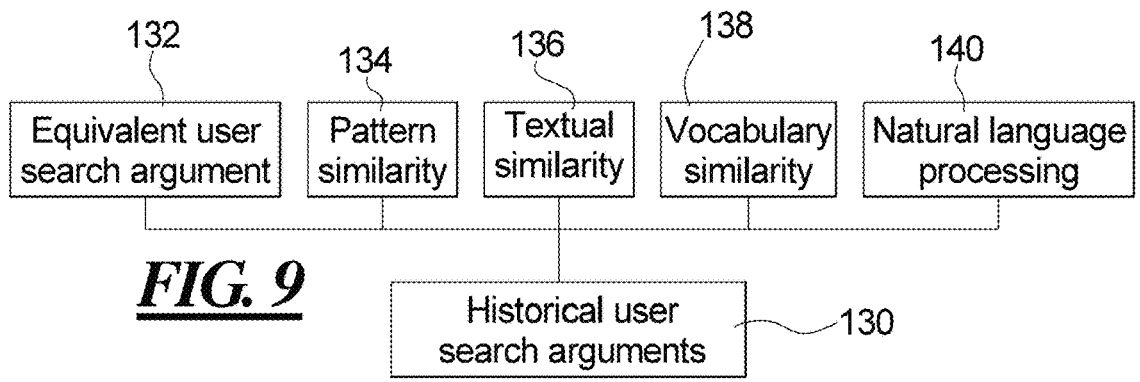
FIG. 9 is a block diagram showing processes for comparing candidate synthetic search arguments to historical records.

Scoring of the candidate synthetic search arguments 44 may include the processes shown in FIG. 9. For each candidate synthetic search argument 44, historical user search arguments 130 are checked for an equivalent user search argument 132 to the candidate synthetic search argument. The checking of historical search arguments 130 is shown at element 56 the system diagram in FIG. 3. The historical user search arguments 130 may be from user interactions via a website, via an app on a mobile device or computer, or other user interaction. If the candidate synthetic search argument 44 matches a historical user search argument 130, then the candidate synthetic search argument 44 is included in the set of training synthetic search arguments as a result of the equivalent user search argument determination 132. The training of the search engine by actual user search arguments is ensured.

A review of historical user search arguments 130 show that users do not search for every product or service available using every descriptor that might apply to the products or services during a given time period. To cover training on search arguments that do not appear in the historical record, the candidate synthetic search arguments 44 are checked for similarity to historical user search arguments 130, as shown at element 58 in FIG. 3. Similarity may be measured on various levels as shown in FIG. 9.

The candidate synthetic search arguments 44 are checked for pattern similarity 134 to the historical user search arguments 130. Where the pattern of descriptors in the candidate synthetic search argument 44 matches the pattern in the historical user search argument 130, the search arguments are considered to have pattern similarity 134 and the candidate synthetic search argument 44 is included in the training set. Pattern similarity may be based on identifying a same pattern of metadata or same pattern of attributes in the candidate synthetic search argument as in a search argument from the historical record, even though the values are different as between the candidate and historical search argument. In an example, a candidate synthetic search argument is "60° countersink." The time period over which the historical user record 130 was taken does not include a search by a user using the search argument "60° countersink" but the recorded historical record does show that users entered search arguments for "82° countersink." The pattern of (countersink angle value)(product) is the same in both the candidate synthetic search argument 44 and the historical user search argument 130. Because of the pattern similarity 134, the candidate synthetic search argument "60° countersink" is saved into the training synthetic search argument set.

Another type of similarity is textual similarity 136. Textual similarity 136 includes calculating edit distance. Edit distance is the number of single-character alterations that are needed to transform the candidate synthetic search argument 44 into a historical user search argument 130. The candidate synthetic search arguments 44 that have a lower edit distance from a historical user search argument 130 receive a higher score, or more points, than candidate synthetic search arguments 44 that have a larger edit distance from historical user search arguments 130. An example of edit distance compares the search argument "60 deg countersink" to the search argument "60 deg countersink" and determines that a one single character alteration will convert one search argument into the other. The edit distance is one character alteration. In another example, the search arguments "60 deg countersink" and "60 degree countersink" are compared and determined to require three single character alterations to convert one to the other. The edit distance is three character alterations. Points are assigned to candidate synthetic search arguments based on the edit distance between the candidate and historical user-input search arguments. More points are assigned to candidate synthetic search arguments that have smaller edit distances, and fewer points are assigned to those with larger edit distances. The textual similarity 136 determination produces a list of candidates each of which has been assigned points for similarity.

Vocabulary similarity 138 is another measure of candidate synthetic search arguments 44. The distribution and presence of descriptors in candidate synthetic search arguments 44 are compared to the distribution and presence of descriptors in historical user-input search arguments 130. A higher score is assigned to candidate synthetic search arguments 44 that contain descriptors that appear in higher frequencies in historical search arguments 130. In an example, user search arguments that are searching for a countersink use the term "countersink" in 55 percent of the historical search arguments 130. The candidate synthetic search arguments 44 used the term "countersink" in 35 percent of the search arguments. The candidate synthetic search arguments 44 that use the term "countersink" are more representative of actual user search arguments and so are assigned a higher score. The vocabulary similarity determination 138 also produces a list of candidates with points assigned to each candidate. A threshold may be applied to the points for vocabulary similarity. The points assigned in the vocabulary similarity determination 138 may be added to the points provided in the textual similarity determination 136 and the total points compared to a threshold.

Neither pattern similarity, textual similarity nor vocabulary similarity requires that the candidate synthetic search argument appears in the historical record. Many candidates do not. The candidate need only be similar in some aspect. The similarity tests set forth here are examples of similarity tests. Other similarity tests are also possible and are within the scope of this invention.

The determination of likely synthetic search arguments as shown at element 60 in FIG. 3 uses natural language processing techniques to compare candidate synthetic search arguments 44 to historical user search arguments 130. FIG. 9 also shows the natural language processing determination 140 that is applied to the candidate synthetic search arguments 44. The candidates deemed more likely to be entered by a user are given higher points than those deemed less likely. The point score for likelihood may be compared to a threshold or may be added to other points so that a total of the points may be compared to a threshold.

Candidate synthetic search arguments 44 may be true, relevant and well formed in that they adhere to semantic, syntactic and pragmatic rules of industrial language, but some will be more likely to be entered by users while others may be less likely. One measure of whether a candidate synthetic search argument is to be entered by a user is the complexity or length of the search argument. The natural language processing 140 may measure length, complexity and other language aspects when determining the likelihood that a candidate synthetic search argument 44 would be entered by a user. A complex and long candidate synthetic search argument such as "1¼ inch high-speed steel countersink for screws" is a plausible search argument that may be input by a user, but it is unlikely because of its length and would be given a low point score. A candidate synthetic search argument such as "1¼ inch high-speed steel countersink for screws made of stainless steel with 6 flutes with a round shaft RoHS compliant" is even less likely because of its complexity and length and would be given an even lower point score. A candidate synthetic search argument such as "82° countersink" is shorter and thus more likely to be entered by a user, so is given a higher point score. The point scores applied in the natural language processing determination 140 may be added to the point scores assigned to the candidates in the similarity tests.

Points assigned to candidate synthetic search arguments 44 in the similarity tests 134, 136 and 138 and likelihood 140 tests are used to determine which candidates should be moved to the training search argument list (the training set) and which should not. A points threshold is selected by the trainer 46 to determine which candidates are chosen for training and which are not. Candidates meeting or exceeding the threshold are placed into the training set. The trainer 46 may select different point thresholds for different training. For example, a first point threshold may be set for a first training run while a different point threshold may be set for a subsequent training run on the search engine. One threshold may be set for training the search engine on one group of products while a different threshold may be set for training on a different group of products. Different threshold levels may be set for training different search engines. Other criteria may be provided for setting different threshold levels.

The training set may include hundreds of thousands to millions of rows of synthetic search arguments and target information. Once the set of candidate synthetic search arguments are chosen for training, the trainer 46 trains the search engine 10 by providing the selected synthetic search arguments and by providing the desired products, services or other information that are sought by the synthetic search arguments (the target information) to the search engine. The search engine receives the list of synthetic search arguments in the training set and attempts to predict the correct target for each synthetic search argument. The predictions are compared to the target information. The search engine refines the structure of the machine translation model using machine learning software for predictions that do not match the target information. Modifications in the machine translation model are made to increase the likelihood that the search engine will generate responses with the correct target information the next time the search engine receives the search arguments.

The process of receiving the synthetic search arguments, making predictions of the target information, comparing the predictions to the target information, and making changes in the language model using machine learning may be referred to as a training epoch. Many training epochs may be required for the search engine to be considered trained on the search arguments of the training set. Training may be considered an iterative process, with improvements in the language model being made by each training epoch. After several training epochs, the changes that result from each training epoch may decrease, a diminishing return. The training epochs may be halted when desired, and the search engine may be connected to receive live user inputs. The search engine is monitored for its success rate with live user data, and may be subject to further training if desired.

The search engine compares the predictions made for the synthetic search arguments to the target information that has been provided in the training set. Training on the synthetic search arguments may proceed quickly compared to training by user interactions. When user interactions are used for training, a success as determined when a user purchases a product lacks immediate feedback as to whether the search response included the desired product. The user may purchase the product later in the interaction sequence, the user may have been just browsing, the user may have decided not to order the product because it is too expensive or for other reasons. Data must be gathered over time and a determination must be made as to when a statistically significant quantity of data has been gathered for the search argument to provide feedback on the accuracy of the search engine responses. Training using the synthetic search arguments coupled with either target information provides immediate and accurate feedback for rapidly building the language model of the search engine. This results in more efficient and more accurate training of the search engine than occurs with user feedback, in part because the user's intent may be unclear or absent, or may result in errors in the training. The search engine may become trained faster than via the use of user inputs and becomes trained on a wider range of products and on new products, without requiring that users experience failed search results that are a necessary part of training.

The synthetic search arguments that are used for training need not provide training for all possible search arguments. Instead, the synthetic search arguments may provide training on a range of possible search arguments with the goal that the search engine becomes trained to recognize similar search arguments from users and respond to the users with the desired products, information or services. The users may input some search arguments that are the same as the synthetic search arguments on which the search engine was trained and may input other search arguments that have not been part of the synthetic search argument training set, but which the search engine nonetheless recognizes because of similarities to the synthetic search arguments on which the search engine was trained.

Training of the search engine 10 uses the set of training synthetic search arguments. The set of training synthetic search arguments chosen for the first training of the search engine may be the best information that is available at the time. As user interactions with the search engine are collected into the historical record, and as industrial language and descriptors change over time, retraining of the search engine 10 may become desirable.

The evaluator 16 of FIG. 1 monitors and analyzes user interactions with the search engine 10. In certain embodiments, continuous monitoring of the user interactions with the search engine 10 is provided, although non-continuous monitoring may also be used if desired. The evaluator 16 measure user reactions and interactions with the website, the app or other search engine interface to the responses provided by the search engine in order to define reactions that constitute a success in identifying the desired product or service. Patterns of user reactions are examined to determine which patterns should be characterized as a success in providing the desired product in the search engine response. The evaluator 16 may add to patterns of user interactions that may be characterized as a success, or may more accurately define interactions as either success or failure.

The evaluator 16 may be used to determine which descriptors and relationships are appropriate or relevant, for example, as shown at element 50 in FIG. 3. New descriptors and relationships that are being used by users may be identified by the evaluator 16. User information including user reaction information is gathered by the evaluator 16 to identify any new information that may be used in generating synthetic search arguments by the search argument simulator 40. Any such new information may be provided to the search argument simulator 40 as new rules, relationships and descriptors for to generate new synthetic search arguments for further training. As search terms change and as industrial language evolves, these changes are included in the argument set for retraining. Previously discarded candidate synthetic search arguments may become more relevant and may be used in new training sets. The search engine 10 may receive further training occasionally or regularly. The search engine 10 may never be considered as finalized and so the search argument generator 40 may also never be in a final state.

Another function of the evaluator 16 may be to monitor user interactions with the website 11, app 13, or other interface for indications that the user interaction or experience could be improved. For example, if users frequently use the back button at some part of the interaction or if users scroll the web page or app past unrelated information to reach desired information, the evaluator 16 may collect this information in order to change the response or the user interface to reduce or avoid these actions. The changes in the interface 11 or 13 may be directed to increasing the success rate of the search results. The evaluator 16 may monitor whether the changes have resulted in an increased success rate once the changes are implemented.

When changes are made that increase the success rate of the search engine responses, the changes may be scored as good components by the evaluator 16. These components may include changes to descriptors, patterns, rules or other aspects used to generate the synthetic search arguments. Changes that result in a negative change in the success rate are scored as bad components. The good and bad components may receive a numerical score that is weighted according to their impact on the feature and according to the change they have made in the user experience. The scored components by the evaluator 16 may be used to modify the search argument simulators utilization 12 of the descriptors, patterns and rules.

An Example of Training on Two Products

The process of generating synthetic search arguments will be explained with reference to a simplified example of two products that each have three attributes. The following example is fictionalized and does not describe actual user interactions or purchases. The application of this process to products having many more attributes and to many more products, services, and information will become apparent.

Figure 10:
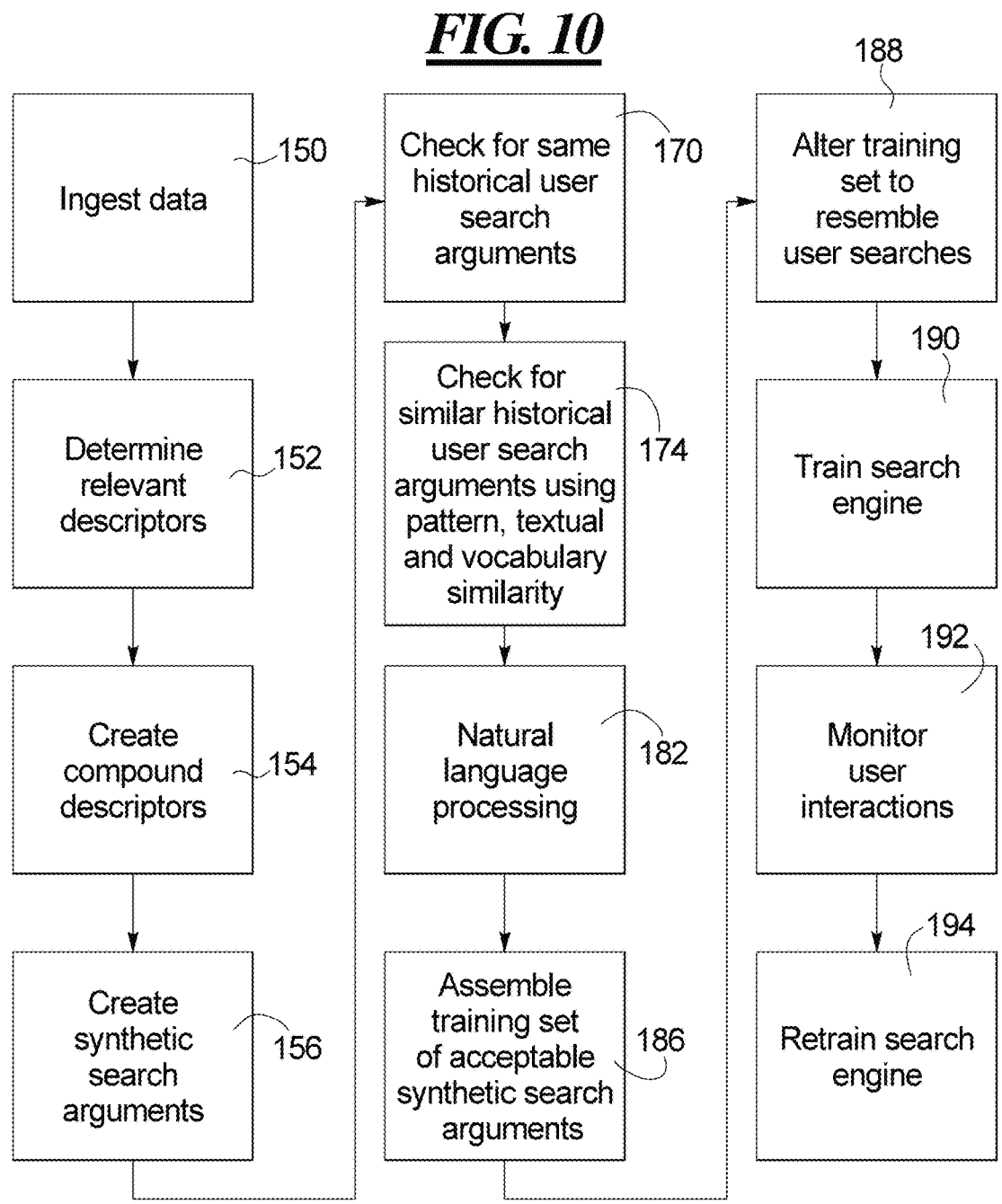
FIG. 10 is a flow diagram showing steps in a process for training a search engine.

First, the data is ingested as shown at the ingest data step 150 of FIG. 10. Information on the products, services or information on which the search engine is to be trained is ingested 150. The first product of the example is countersink A, which is made of the material high-speed steel, has a body diameter of ¼ inch, and is for use on aluminum, brass, bronze, iron, stainless steel, steel and plastic. The second product is countersink B, which is made of the material uncoated carbide, has a body diameter of ¼ inch, and is for use on aluminum, brass, bronze, fiberglass, hardened steel, iron, nickel, plastic, stainless steel, steel, titanium, and tool steel. This information is provided with the metadata of (attribute)(value). The information is provided at the ingest data step 150 and constitutes the product and service information that informs the search argument simulator.

Customer or user generated information is available for these products from records of telephone calls from users and from emails received from users. The record of the telephone calls may include recordings of the telephone calls, transcripts of the telephone calls, notes of the telephone calls by customer service or sales personnel, or other records. The customer or user generated information is filtered based on the data about the customers or users to isolate the data from the users whose colloquial industrial language is to be replicated. Filtering in the example has yielded a single user interaction in the firm of a recording of a telephone call between a company representative and a user, Jane Smith of ABC Manufacturing.

The record of the telephone call goes like this. Jane Smith (J S): Hi, I would like a WC countersink. Company Representative: I have two countersinks available, but we don't have WC listed as a specification. J S: Oh, you folks call that uncoated carbide, I forgot. I'll take five of countersink B.

The interaction with the customer shows that some users use the term "WC" to refer to "uncoated carbide." This information is ingested 150 for utilized in producing synthetic search arguments to train the search engine.

Historical interactions with users are reviewed for purchases of either countersink A or countersink B. The historical record shows the following information. On Apr. 22, 2019 a user input the search argument "¼ countersink" and purchased countersink B. On May 1, 2019 a user entered the search argument "0.25 countersink" and purchased countersink A. On May 19, 2019 a user entered the search argument "csk" and purchased countersink A. On Jul. 10, 2019 a user entered the search argument "csnk" and purchased countersink B. On Jul. 22, 2019 a user entered the search argument "csk" and purchased countersink B. On Jul. 23, 2019 a user entered the search argument "csnk" and purchased countersink A.

The historical record shows that users commonly enter the abbreviations or misspellings "csk" and "csnk" to refer to countersinks as a product group, but these abbreviations are not specific to one product within the product group. This information is ingested 150 as well.

Next is the determine relevant descriptors step 152. The candidate product and language information from various sources has been gathered and is then tabulated into tokens that will make up the synthetic search arguments. The tokens are also referred to as descriptors and are usually in the form of words or other information. Linguistic rules and machine learning techniques may be used to transform the information into descriptors.

In this example, the following rules are applied. a) Remove pluralization. b) Apply synonyms from historical interactions. c) Apply synonyms from unstructured user information (which may require machine learning or manual annotations of the unstructured information). d) Remove dashes and special characters. e) Include unique tokens. f) Remove units of measure. f) Convert fractions to decimals. h) Apply colloquial numeric conversions (such as converting ½ to one-half). i) Convert elements to their atomic symbols. j) Apply British English synonyms.

The rules are applied to the terms or descriptors, in this example for the product group countersinks. Beginning with synonyms for the product group, the term "countersink" is obtained by applying rule a) to remove the "s" because pluralizations are not relevant to the search results. The term "csk" is obtained under rule b) from the historical record of user interactions. The term "csnk" is also obtained under rule b) from the historical record of user interactions. The transformations of the terms are tabulated.

Next the rules are applied to the values listed in the product information. Under the attribute "material" the value "high-speed steel" is transformed to "highspeed steel" by applying rule d) to remove the dashes and special characters. The term "high speed steel" is obtained under rule d) by replacing the dashes with spaces. The term "steel" is obtained by applying rule e) because the term "steel" is unique as a material and can be an abbreviation for high-speed steel. The term "high-speed" is obtained under rule e) as a unique term due to it being an abbreviation of high-speed steel. Under the attribute "material" the value "uncoated carbide" is transformed to "carbide" by applying rule e because "carbide" is unique and is valid as an abbreviation for "uncoated carbide" under the attribute "material." The term "uncoated" is obtained under rule e) as a unique descriptor that is applied to this element of product information. The term "wc" is obtained under rule c) as being extracted from the unstructured information of the conversation with a customer.

The attribute of "body diameter" has a value of "¼"" which is transformed into "¼" under rule f) by removing units of measure for numerical values. The value is transformed into "0.25'"" under rule g) that translates fractions into decimals. The term "025" is obtained under rules f) and g) that transforms the value into decimal and removes the unit of measure. The term "quarter-inch" is obtained under rule h) by applying a common English colloquial translation of a numerical value. The term "quarter inch" is obtained by applying rules h) and d) to use the colloquial translation of the numerical value and to remove the dashes.

The attribute "for use on" includes values that are a list of materials that are deconstructed into discrete elements. The value "aluminum" is provides the terms "al" under rule j) as the atomic symbol for the material and the value "aluminium" as a British synonym for the material. The terms "brass," "bronze," and "fiberglass" are not further transformed, but the term "hardened steel" provides the term "hardened" under rule e) as a unique term in this context. For the materials "iron" and "nickel" the application of rule j) obtains the terms "fe" and "ni" for their atomic symbols. "Plastic" is not a source for a further term, but the term "stainless steel" is a source for the term "stainless" as a unique term in this context under rule e). The term "steel" appears on its own, but the material "titanium" is a source for obtaining the term "ti" under rule j) for the atomic symbol. Finally, the term "tool steel" provides the term "tool" as a unique term under rule e). Each of the terms mentioned are gathered as a complete collection of valid descriptors for the two products of the example.

In FIG. 10, the next step is to create compound descriptors 154. An example of a compound descriptor for the two products under the attribute "material" is "highspeed steel" which combines the tokens "highspeed" and "steel." The compound descriptor is linked to the product specification of "material: high-speed steel." Another example is "high speed steel" which is generated for the same reasons. Of course, many more are possible.

Complex compound descriptors may be generated, which may include descriptor tokens for multiple attributes. Complex compound descriptors may be needed to accurately reflect aspects of structured information. Complex compound descriptors are not listed here for the sake of brevity.

Rules may be applied when generating compound descriptors. In one example, "steel" is a synonym for "material: high speed steel" and is also a synonym for "for use on: steel." Creating compound descriptors may result in the term "steel" appearing twice in a row as "steel steel." Duplicate words are not found in the historical record of user search arguments, so a rule is applied to disallow combinations that result in repeated words. Other rules are also possible.

Next, synthetic search arguments are created at a create synthetic search arguments step 156. In the two product example, the synthetic search arguments are created using the patterns (value product information token)+(product group token) and (product group token). In creating synthetic search arguments for the real world beyond this limited example, patterns are selected based on the requirements of the search engine software. Real world synthetic search arguments may include attribute product information, such as "material" and "for use on" which are not listed in this example. Also, real world synthetic search arguments may use more than one value product information descriptors.

The result of the synthetic search argument creation step 156 produces the set of candidate synthetic search arguments 158 listed in FIGS. 11a, 11b and 11c. The synthetic search arguments are shown along with their metadata. The listing includes a first column 160 showing the pattern used, a second column 162 showing the product, a third column 164 showing the synthetic search argument (SSA), and a fourth column 166 showing the target. The target is the product, product group or other information that is to be identified by the search argument. The listed synthetic search arguments 158 include the data that will eventually be used to train the search engine. Even though the example has been limited to a set of product information that includes just two products each with three attributes, the result in a set of 200 candidate synthetic search arguments. A typical product group with dozens or hundreds of products that each have more attributes may result in the generation of millions of candidate synthetic search arguments. Including multiple product groups such as may be offered by a company may result in candidate synthetic search arguments that number into the billions.

The set of candidate synthetic search arguments 158 are refined into a set of training synthetic search arguments by the trainer 46. Not all candidate synthetic search arguments are equally likely to be entered by a user. More likely candidates should be used for training. In addition, the search engine software may constrain the volume of training data that can be used in training and/or may constrain the distribution of the training data used. The candidate synthetic search arguments 158 are converted into a set of training data that suits the search engine to be trained. Search engine software is configured to operate on real life search arguments from users. The search engine software performs better and training is more effective when the training data has a similar content and similar argument distribution as real life search activity.

A check of historical user search arguments as shown at 170 in FIG. 10. The historical search arguments that were used in the ingest data step 150, as described above. When comparing the candidate synthetic search arguments 158 to the historical search arguments, the search argument set 172 as shown in FIG. 12 is found in the historical user search argument set. The results 172 of the comparison to historical search arguments 170 are added to the training set. The results 172 include duplicates which are representative of the two product offering and of the historical record showing that the term "csk" has been used in search arguments for both countersink A and countersink B products.

Next, the candidate synthetic search arguments 158 are checked for those that are similar to the search arguments that appear in the historical record 170. Similarity testing is shown collectively at 174 in FIG. 10, and may include several similarity tests, for example as shown in FIG. 9. Similarity testing identifies synthetic search arguments that are not exactly like those used in the historical record 170 but have general patterns of similarity to prior search arguments. As show in FIG. 9, pattern similarity checking 134 looks for similar patterns in searches in the past. The historical record 130 shows that users have entered four search arguments in the past for the product group without any modifiers. The candidate synthetic search arguments that match the pattern of product group without modifiers are shown in FIG. 13 as set 176.

Another pattern identified in the historical record 130 is the pattern (body diameter+product). The candidate synthetic search arguments that match the pattern (body diameter+product) are collected as listing 178 in FIG. 14. The set 178 is large as a result of including the different ways that the body diameter of the countersink may be expressed, including as a fraction, as a decimal, or as text, each either with or without units of measurement.

Textual similarity, as shown at 136 in FIG. 9, is another similarity test 174 and is calculated by determining the edit distance between the candidate synthetic search arguments and the historical user search arguments. The result of the textual similarity testing 136 is a range of point scores. For example, the candidate synthetic search argument "high-speed steel countersinks" has a score of 17, which indicates that 17 single digit changes are required to change between the candidate synthetic search argument and a user search argument found in the historical record. The candidate synthetic search argument "fe countersink" has an edit distance score of 3, indicating that three single digit changes will convert between the candidate synthetic search argument and a historical user search argument. The candidate synthetic search argument "fe countersink" is not too textually different than historical user searches unlike the quite distinct candidate with the 17 score. After scoring the candidate synthetic search arguments 158, a threshold of 5 points was selected in this example. Other threshold levels may be selected as desired. By applying the threshold of five edit changes or less to the listing of candidate synthetic search arguments 158, the original set of candidate synthetic search arguments 158 is reduced to listing 180 as shown in FIGS. 15*a* and 15*b*. The listing 180 shows the candidates that have greater textual similarity to historical user search arguments than the candidates that are below the five point textual similarity threshold.

The next similarity test is for vocabulary similarity, which is show at 138 in FIG. 9. Vocabulary similarity weighs descriptors that consistently appear in historic user search arguments. In the limited example being presented here, no additional descriptors were found in the historical record that are not already in the candidate synthetic search arguments 158. In other words, no out-of-vocabulary descriptors were found. As a result, no further candidate synthetic search arguments were added as a result of vocabulary similarity testing. Any test or determination of the candidate synthetic search arguments may result in no additions to the training set. Out-of-vocabulary descriptors may include miss-spelled words, abbreviations, typographical errors, non-standard terms, partial values, or other variations that may be input by users. Out-of-vocabulary descriptors that appear frequently in the historical record may be used in the training of the search engine.

As an example of how vocabulary similarity testing would work, if the historical record had included a user search argument of "strong csk," the vocabulary similarity testing may add "strong csk" as a training synthetic search arguments. A determination would be made as to what target product should be linked to the added search argument. In the example, the term "strong" is not found in the structured industrial language that describes the product line nor is it linked to any particular product in the product line. The term "strong" may be an "out-of-vocabulary" term. The term "strong" does describe all countersink products offered since all of the countersinks comply with strength standards. In this situation, the added search argument "strong csk" would be linked to the general target "product group: countersinks" rather than being linked to a particular type of countersink. If, on the other hand, the vocabulary similarity testing found a search argument that could be linked to a particular product or to a product trait, the found search argument may be added to the training synthetic search arguments along with a link to that product or trait.

Natural language processing algorithms are applied to the candidate synthetic search arguments, as shown in FIG. 9 at 140 and as shown in process step 182 in FIG. 10. Natural language processing 182 relates to the interactions between computers and human languages, particularly how computers process and analyze natural language data. Natural language algorithms are based on extensive research into colloquial English, for example, and can be used to calculate the similarity between one phrase and another. Here, natural language algorithms are used to calculate the general similarity between historical search arguments and the candidate synthetic search arguments 158. The result of the natural language processing is capture of some synthetic search arguments that were excluded by the edit distance filter but would seem very relevant to the search by a human. The output of the natural language processing step 182 is search argument listing 184 shown in FIGS. 16*a* and 16*b*.

The result of the filtering of the candidate search arguments 158 is to assemble a training set 186 of synthetic search arguments as shown in FIG. 10. The training set of the two product example includes the sets 172, 176, 178, 180, 184 of FIGS. 12 through 16*b*. The training set 186 includes the synthetic search arguments that have been found to be acceptable after filtering and testing.

The assembled training set 186 is turned over to the trainer 46. The trainer 46 alters the distribution of the synthetic search arguments to better resemble the distribution of user search arguments that users may input into the search engine 10, as shown at step 188 in FIG. 10. In the historic record, people enter search arguments that describe the product group alone at about 10 times the frequency that they enter search arguments consisting of the product group and a modifier. For example, a search argument for "countersinks" is about 10 times more common as a user input than "025 inch countersinks." To better match the distribution of search arguments found in the historical record, the trainer 46 duplicates certain rows of synthetic search arguments in the training set. For example, the synthetic search arguments that do not include the diameter measurement of the countersink may be duplicated to more resemble the distribution of user inputs.

At step 190, training of the search engine 10 is undertaken. The synthetic search arguments and the target information for each synthetic search argument are provided to the search engine. The synthetic search arguments and target information in the training set may be provided to the search engine in its entirety, or in batches or as inputs spaced by intervals or otherwise submitted to simulate the timing of user inputs. The synthetic search arguments for a product line or product family may be submit together or may be interspersed with synthetic search arguments targeting other product lines or families. By receiving the target information at the same time as the synthetic search argument, the search engine may compare the interpretation of the search argument to the target information and may make changes to the language model so that the search engine is quickly trained on the synthetic search terms in the training set. The training set may be repeated in multiple training epochs to further improve the language model. Training on an entire class of goods or even on an entire catalog of products or other information is possible in far less time and with greater accuracy than if the search engine is trained by user inputs over the course of weeks, months or longer.

The search engine 10 performs machine learning by generating a numerical representation of the text input and by using a series of mathematical permutations to translate phrases from one language to another. For the present example, the input language is colloquial English as related to industrial parts and the output language is structured information describing the parts. The machine learning function uses many examples of correct inputs and outputs to learn the rules of translation which form a translation model. The synthetic search arguments and the target information provide the corpus of training data for the translation model of the search engine.

Extensive manual enumeration of the translation rules is not required for the machine learning function. Even without manual input of translation rules, the machine learning translation function learns to provide the correct response to search arguments. For example, the search argument "iron countersink" would be translated into "product group: countersinks, for use on: iron." The machine learning function learns from the training that "iron" in the search argument means "for use on: iron."

Trained machine learning translation is particularly useful in that it generalizes inputs that it has not seen. A trained machine translation function in a search engine may provide a correct interpretation of a search argument that the search engine has not been trained on if the search engine has been trained on similar search arguments. The machine translation function predicts the meaning of the new term from similar terms on which it has been trained. Users who do not use the exact language on which the search engine has been trained may receive a correct response to their search arguments. The training set of synthetic search arguments may include a range of descriptors to enable the search engine to generalize or predict the meaning of nearly any search argument a user is likely to submit.

An example of generalization or prediction of an interpretation from an unseen term is that the user submits the search argument "iron c-sink." The search engine has not been trained on the term "c-sink." The training on search arguments such as "iron countersink," "iron csk" and others may lead the machine learning function to correctly translate the "iron c-sink" search argument as "product group: countersinks, for use on: iron." By including synthetic search argument that have a target of "for use on: iron" in the training set, the machine learning function learns that "for use on: iron" is a viable translation of the input term "iron." If search arguments having a target of "for use on: iron" had not been included, the translation function may not have learned to correctly translated the search term "iron." If the training set had only included "for use on" specifications, the translation function would predict one of the possible specifications, even for simple searches.

Once the translation model of the search engine 10 is trained, the translation model may be connected to receive user inputs from a website, from apps running on mobile computer devices, or from other inputs. In the example, the trained translation model translates user inputs by users who are seeking countersinks and provides product information on the countersinks in responses to the search arguments. The translation model influences user search results. As noted above, the example is fictionalized and does not describe an actual use of the trained search engine.

The evaluator 16 tracks user outcomes from user search arguments submitted to the search engine 10 that has been trained on the synthetic search arguments. Monitoring user interactions is shown at 192 in FIG. 10. The outcomes provide information on whether the synthetic search argument generator 40 and the trainer 46 performed to train the search engine 10 and whether further training or adjusting parameters in training may improve responses to user search arguments. Numerous metrics are available to measure user interactions. In the example, the metric being used is whether a user added to their order after submitting a search argument to the newly trained search engine.

User interactions with the newly trained search engine include the following. 1) On Aug. 5, 2019 a user submitted the search argument "countersink" and then purchased countersink A. 2) On Aug. 8, 2019 a user submitted the search argument "tool cnsk" and then ordered countersink A. 3) On Aug. 8, 2019 a user submitted the search argument "tools cnsk" and then ordered countersink A. 4) On Aug. 10, 2019 a user submitted the search argument "steel csk" and then ordered countersink B. 5) On Aug. 16, 2019 a user submitted a search argument "steel countersink" and then ordered countersink B.

The evaluator 16 examines the data from the user interactions. The following insights are obtained. a) From the interactions 2) and 3), the term "tool" may not be a correct synonym for "for use on: tool steel" because countersink A does not have "for use on: tool steel" as a specification. The term "tool" may be an "out of vocabulary" term, that may be used by people to describe countersinks as a type of tool. b) From the interactions 4) and 5), the term "steel" may be a synonym for the attribute "for use on: hardened steel" because both searches containing the term "steel" resulted in the purchase of countersink B which is for use on hardened steel, whereas countersink A is not for use on hardened steel. Neither search 4) nor 5) resulted in the purchase of countersink A, which is made of high-speed steel. The evaluator 16 may determine that users do not search for the material of the product using the language of searches 4) and 5).

In addition to examining user interactions via a website and apps, the evaluator 16 may also receive information on communications via other channels, including from customer service centers or contact center representatives. Monitoring user interactions 192 may include monitoring a plurality of communication channels. In the example, a contact center representative received a telephone call from Pat Doe from GT Aerospace during the evaluation period. The record of the telephone call includes the following information. Jane Doe said, "I went to your website and searched for steel countersinks, but I only found carbide countersinks. I thought you had steel ones." The Company Representative replied, "Yes, we have countersinks made of high-speed steel." Jane Doe commented, "Oh, I typed steel and didn't find it. That's weird. I'll take one of the high-speed steel ones." The interaction provides evidence that users type "steel countersinks" and mean "material: high-speed steel." This telephone interaction contradicts a conclusion from the website interactions.

Once sufficient user data is collected, the evaluator 16 triggers the synthetic search argument generator to rebuild the synthetic search argument set and retrain the search engine 10. Retraining the search engine is shown at 194 in FIG. 10. Retraining the search engine 194 may involve repeating any or all of the steps described above, including rebuilding a new training set of synthetic search arguments based on new or updated information or different threshold levels or other different criteria. Retraining the search engine 194 may be performed multiple times, depending on the outcomes of the monitored user interactions 192.

In the two product example, the evaluator 16 triggers the search argument generator to remove the relationship between the term "tool" and the specification "for use on: tool steel." The reason is the evaluator's determination as described above. The term "steel" has been found by the evaluator 16 to be ambiguous as to whether it is a value for the attribute "material" as in "material: high-speed steel" or a value for the attribute "for use on" as a result of the contradictory information received. This ambiguous information may be incorporated into the new training set. The five examples of user interactions will be added to the historical data when the new training set is generated. The updated historical data will be used in the determine relevant descriptors and the trainer steps.

In real world examples that have more than two products, the training, evaluation, rebuilding the training set, and retraining cycle is repeated many times to fine tune the results. The evaluator determines if the a statistically significant increase in the success of the search engine responses has occurred as a result of the retraining. The cycle may be repeated if significant user interaction data has been collected or if there is a significant percentage of new user search arguments that have been received for the product, product group or other division.

Aspects of the invention are provided.

According to a first aspect, a training apparatus for training a search engine, comprises: a search argument simulator configured to generate a synthetic search argument and target information, the search argument simulator being operable to transmit the synthetic search argument to a search engine for training the search engine to respond to the synthetic search argument with the target information; and an evaluator configured to monitor a response by the search engine to the synthetic search argument, the evaluator being configured to determine if the response by the search engine includes the target.

According to a second aspect, the training apparatus as in the first aspect, wherein the search argument simulator includes a synthetic search argument generator, the synthetic search argument generator being configured to ingest data, to determine relevant descriptors, to create compound descriptors and create candidate synthetic search arguments.

In a third aspect, the training apparatus of the second aspect, wherein the synthetic search argument generator is configured to deconstruct the data into descriptors and to apply metadata to each descriptor.

In a fourth aspect, the training apparatus of the third aspect, wherein the synthetic search argument generator is configured to assemble the descriptors into compound descriptors based on authored relationships of descriptors and historical search arguments containing compound descriptors.

In a fifth aspect, the training apparatus of the third aspect, wherein the synthetic search argument generator is configured to create the candidate synthetic search arguments using patterns of descriptors that are defined by the metadata of the descriptors.

In a sixth aspect, the training apparatus of the first aspect, wherein the search argument simulator includes a trainer, the trainer being configured to identify candidate synthetic search arguments that are found in historical search arguments, to identify candidate synthetic search arguments that are similar to historical search arguments, to identify synthetic search arguments that are likely to be used by a user based on historical search arguments, and to train the search engine using the identified synthetic search arguments.

In a seventh aspect, the training apparatus of the sixth aspect, wherein the trainer is configured to select candidate synthetic search arguments that are identical to search arguments in a historical record of user input search arguments.

In an eighth aspect, the training apparatus of the sixth aspect, wherein the trainer is configured to select candidate synthetic search arguments that are similar in pattern of descriptors to search arguments in a historical record of user input search arguments, pattern similarity being determined by identifying a same pattern of attributes in the candidate synthetic search argument as in a search argument from the historical record.

In a ninth aspect, the training apparatus of the sixth aspect, wherein the trainer is configured to select candidate synthetic search arguments that are textually similar to search arguments in a historical record of user input search arguments, the textual similarity being determined by an edit distance below a predetermined threshold as between the candidate synthetic search argument and a search argument from the historical record.

In a tenth aspect, the training apparatus of the sixth aspect, wherein the trainer is configured to select candidate synthetic search arguments that have vocabulary similarity to search arguments in a historical record of user input search arguments, the vocabulary similarity being determined by comparing a frequency of descriptors used in the candidate synthetic search argument and a search argument from the historical record.

In an eleventh aspect, the training apparatus of the sixth aspect, wherein the trainer is configured to select candidate synthetic search arguments by natural language processing, the natural language processing including selecting candidate synthetic search arguments base on length and complexity of the candidate synthetic search argument as compared to search arguments in a historical record of user input search arguments.

In a twelfth aspect, the training apparatus of the first aspect, further comprising: a database containing information for use by the search argument simulator in generating synthetic search arguments, the database containing attributes and values on information on which the search engine is to be trained, and the database containing historical interaction information between users and a search engine.

In a thirteenth aspect, the training apparatus of the twelfth aspect, wherein the attributes and values in the database are specifications of products on which the search engine is to be trained by synthetic search arguments generated by the search argument simulator.

In a fourteenth aspect, the training apparatus of the twelfth aspect, wherein the database contains user generated information including at least one of: an email from a user or a record of a telephone call from the user for use by the search argument simulator in generating synthetic search arguments.

In a fifteenth aspect, the training apparatus of the twelfth aspect, wherein the database contains user information including at least one of: identification of an industry in which the user works or information on the company for which the user works.

In a sixteenth aspect, the training apparatus of the first aspect, wherein the evaluator is configured to monitor a response by the search engine to a user input search argument; and wherein the evaluator is configured to trigger retraining of the search engine if the search engine fails to locate user desired information in response to the user input search argument.

In a seventeenth aspect, the training apparatus of the sixteenth aspect, wherein the evaluator is configured to monitor the response by the search engine to a user input search argument that is not included in a training set of synthetic search arguments prepared by the search argument simulator on which the search engine has been trained, and wherein the evaluator is configured to trigger changes in the training set of synthetic search engine arguments.

In an eighteenth aspect, a method for training a search engine, comprises: ingesting data into a search argument simulator, the data including specifications of information on which the search engine is to be trained and historical interactions of users with a search engine; determining relevant descriptors from the ingested data; creating compound descriptors from the relevant descriptors; creating candidate synthetic search arguments from the relevant descriptors and the compound descriptors; selecting a training set of synthetic search arguments from the candidate synthetic search arguments based on similarities to search arguments in a historical record of user input search arguments; and training the search engine using the training set of synthetic search arguments.

In a nineteenth aspect, the method of the eighteenth aspect, wherein the candidate synthetic search arguments include target information.

In a twentieth aspect, the method of the eighteenth aspect, wherein the selecting the training set includes selecting candidate synthetic search arguments that match search arguments in the historical record.

In a twenty-first aspect, the method of the eighteenth aspect, wherein the selecting the training set includes selecting candidate synthetic search arguments that have a same pattern of attributes as search arguments in the historical record based on pattern similarity.

In a twenty-second aspect, the method of the eighteenth aspect, wherein the selecting the training set includes selecting candidate synthetic search arguments that exceed a threshold of textual similarity based on edit distance as search arguments in the historical record.

In a twenty-third aspect, the method of the eighteenth aspect, wherein the selecting the training set includes selecting candidate synthetic search arguments that include descriptors that appear in search arguments in the historical record based on vocabulary similarity.

In a twenty-fourth aspect, the method of the eighteenth aspect, wherein the electing the training set includes selecting candidate synthetic search arguments based on calculated similarity between candidate synthetic search arguments and search arguments in the historical record as determined by natural language processing.

In a twenty-fifth aspect, the method of the eighteenth aspect, further comprising: altering the training set of synthetic search arguments by repeating synthetic search arguments within the training set.

In a twenty-sixth aspect, the method of the eighteenth aspect, further comprising: monitoring user input search arguments and responses by the search engine; and triggering retraining of the search engine using a different training set of synthetic search arguments.

In a twenty-seventh aspect, a search engine trained using synthetic search arguments, comprising: a search engine configured to respond to user input search arguments, the search engine including a machine translation model generated by receiving synthetic search arguments and target information from a search argument simulator, the synthetic search arguments including search arguments having similarities to historical search arguments by users.

Thus, there has been shown and described an apparatus and method for training a search engine generates synthetic search arguments and target information that are provided to the search engine as training. A search argument simulator ingests product information and historical interaction data, determines relevant descriptors, creates compound descriptors, and creates candidate search arguments. A trainer checks the candidates against historical search arguments, identifies similar search arguments and determines likely search arguments that are used for training. An evaluator monitors search engine responses and triggers retraining of the search engine.

Although other modifications and changes may be suggested by those skilled in the art, it is the intention of the inventors to embody within the patent warranted hereon all changes and modifications as reasonably and properly come within the scope of their contribution to the art.

We claim:

1. A training apparatus for training a search engine, the training apparatus comprising:
a memory that stores product information of a product in an on-line product catalog and historical interaction data of users with the search engine; and
a processor configured to:
execute a search argument simulator, the search argument simulator, when executed by the processor, configuring the processor to generate candidate synthetic search arguments that seek the product in the on-line product catalog based upon the product information or the historical interaction data stored in the memory and target information identifying the product sought by the synthetic search arguments and to select synthetic search arguments from the candidate synthetic search arguments that seek the product in the on-line product catalog based on similarities to search arguments in a historical record of user input search arguments, the search argument simulator being operable to transmit the synthetic search arguments to the search engine to train the search engine to respond to the synthetic search arguments with the target information,
execute an evaluator, the evaluator, when executed by the processor, configuring the processor to:
monitor a response by the search engine to the synthetic search arguments, the evaluator being configured to determine if the response by the search engine to the synthetic search argument includes the target information,
monitor a second response by the search engine to a user input search argument that seeks the product in the on-line product catalog, and
trigger retraining of the search engine if the search engine fails to identify the product sought by the user input search argument.

2. The training apparatus as claimed in claim 1, wherein the search argument simulator, when executed by the processor, further configuring the processor to ingest data including the product information of the product in the on-line product catalog and the historical interaction data of users with the search engine, to determine relevant descriptors of the product in the on-line product catalog, to create compound descriptors of the product in the on-line product catalog, and to create the candidate synthetic search arguments that seek the product in the on-line product catalog.

3. The training apparatus as claimed in claim 2, wherein the search argument simulator, when executed by the processor, further configures the processor to deconstruct the data into descriptors that include atomic units of meaning and to apply metadata to the descriptors.

4. The training apparatus as claimed in claim 3, wherein the search argument simulator, when executed by the processor, further configures the processor to assemble the descriptors into the compound descriptors based on authored relationships of the descriptors and historical search arguments containing the compound descriptors.

5. The training apparatus as claimed in claim 3, wherein the search argument simulator, when executed by the processor, further configures the processor create the candidate synthetic search arguments that seek the product in the on-line product catalog using patterns of descriptors that are defined by the metadata applied to the descriptors.

6. The training apparatus as claimed in claim 1, wherein the search argument simulator, when executed by the processor, configures the processor to select the synthetic search arguments from the candidate synthetic search arguments that are identical to the search arguments in the historical record of user input search arguments.

7. The training apparatus as claimed in claim 1, wherein the search argument simulator, when executed by the processor, configures the processor to select the synthetic search arguments from the candidate synthetic search arguments that have pattern similarity to the search arguments in the historical record of user input search arguments, the pattern similarity being determined by identifying same patterns of attributes in the candidate synthetic search arguments as in the search arguments from the historical record of user input search arguments.

8. The training apparatus as claimed in claim 1, wherein the search argument simulator, when executed by the processor, configures the processor to select the synthetic search arguments from the candidate synthetic search arguments that are textually similar to the search arguments in the historical record of user input search arguments, the textual similarity being determined by edit distances below a predetermined threshold as between the candidate synthetic search arguments and the search arguments from the historical record of user input search arguments.

9. The training apparatus as claimed in claim 1, wherein the search argument simulator, when executed by the processor, configures the processor to select the synthetic search arguments from the candidate synthetic search arguments that have vocabulary similarity to the search arguments in the historical record of user input search arguments, the vocabulary similarity being determined by comparing frequencies of descriptors used in the candidate synthetic search arguments and the search arguments from the historical record of user input search arguments.

10. The training apparatus as claimed in claim 1, wherein the search argument simulator, when executed by the processor, configures the processor to select the synthetic search arguments from the candidate synthetic search arguments by natural language processing, the natural language processing including selecting the synthetic search arguments base on lengths and complexities of the candidate synthetic search arguments as compared to the search arguments in the historical record of user input search arguments.

11. The training apparatus as claimed in claim 1, wherein the memory further stores a database containing information for use by the search argument simulator in generating the candidate synthetic search arguments, the product information of the product in the on-line product catalog on which the search engine is to be trained, and the historical interaction data of users with the search engine.

12. The training apparatus as claimed in claim 11, wherein the product information of the product in the on-line product in the database relates to a specification of the product in the on-line product catalog on which the search engine is to be trained using the synthetic search arguments.

13. The training apparatus as claimed in claim 11, wherein the database contains user generated information including at least one of: an email from a user or a record of a telephone call from the user, and wherein the search argument simulator, when executed by the processor, configures the processor to generate the candidate synthetic search arguments that seek the product in the on-line product catalog based upon the at least one of: the email from the user or the record of the telephone call from the user.

14. The training apparatus as claimed in claim 11, wherein the database contains user information including at least one of: identification of an industry in which a user works or information on a company for which the user works, and wherein the search argument simulator, when executed by the processor, configures the processor to generate the candidate synthetic search arguments that seek the product in the on-line product catalog based upon the at least one of: the identification of the industry in which the user works or the information on the company for which the user works.

15. The training apparatus as claimed in claim 1, wherein the evaluator, when executed by the processor, configures the processor to: monitor the second response by the search engine to the user input search argument that is not included in the set of synthetic search arguments, and trigger a change in the set of synthetic search engine arguments.

16. The training apparatus as claimed in claim 1, wherein the synthetic search argument generator is operable to transmit the synthetic search arguments to the search engine to train the search engine to interpret the synthetic search arguments to identify the target information.

17. The training apparatus as claimed in claim 16, wherein the search engine, when executed by the processor, further configures the processor to:
   compare an interpretation of the synthetic search arguments to the target information, and
   train the search engine to predict the target information when the interpretation of the synthetic search arguments does not match the target information.

18. A method for training a search engine, the method comprising:
   ingesting data into a processor, the data including product information of a product in an on-line product catalog on which the search engine is to be trained and historical interaction data of users with the search engine that includes a historical record of user input search arguments;
   determining, by the processor, relevant descriptors of the product in the on-line product catalog from the ingested data;
   creating, by the processor, compound descriptors of the product in the on-line product catalog from the relevant descriptors;
   creating, by the processor, candidate synthetic search arguments that seek the product in the on-line product catalog from the relevant descriptors and the compound descriptors;
   selecting, by the processor, synthetic search arguments from the candidate synthetic search arguments that seek the product in the on-line product catalog based on similarities to search arguments in the historical record of user input search arguments;
   providing, by the processor, the synthetic search arguments to the search engine to train the search engine to provide a response that includes target information identifying the product in the on-line product catalog sought by the synthetic search arguments;
   monitoring, by the processor, a response by the search engine to the synthetic search arguments, the evaluator being configured to determine if the response by the search engine to the synthetic search argument includes the target information;

monitoring, by the processor, a second response by the search engine to a user input search argument that seeks the product in the on-line product catalog; and triggering, by the processor, retraining of the search engine if the search engine fails to identify the product sought by the user input search argument.

19. The method as claimed in claim 18, wherein the candidate synthetic search arguments include target information identifying the product sought by the candidate synthetic search arguments.

20. The method as claimed in claim 18, wherein the selecting the synthetic search arguments comprises selecting the synthetic search arguments from the candidate synthetic search arguments that match the search arguments in the historical record of user input search arguments.

21. The method as claimed in claim 18, wherein the selecting the synthetic search arguments comprises selecting the synthetic search arguments from the candidate synthetic search arguments that have a same pattern of attributes as the search arguments in the historical record of user input search arguments based on pattern similarity.

22. The method as claimed in claim 18, wherein the selecting the synthetic search arguments comprises selecting the synthetic search arguments from the candidate synthetic search arguments that exceed a threshold of textual similarity based on edit distances between the candidate synthetic search arguments and the search arguments in the historical record of user input search arguments.

23. The method as claimed in claim 18, wherein the selecting the synthetic search arguments comprises selecting the synthetic search arguments from the candidate synthetic search arguments that include descriptors that appear in the search arguments in the historical record of user input search arguments based on vocabulary similarity.

24. The method as claimed in claim 18, wherein the selecting the synthetic search arguments comprises selecting the synthetic search arguments from the candidate synthetic search arguments based on calculated similarities between the candidate synthetic search arguments and the search arguments in the historical record of user input search arguments as determined by natural language processing.

25. The method as claimed in claim 18, further comprising:

altering the synthetic search arguments by repeating synthetic search arguments within the synthetic search arguments.

26. The method as claimed in claim 18, further comprising:

monitoring user input search arguments that seek the product in the on-line product catalog and responses by the search engine identifying the product sought by the user input search arguments; and triggering retraining of the search engine using different synthetic search arguments from the candidate synthetic search arguments.

27. A search engine trained using synthetic search arguments, comprising:

a memory configured to store the search engine; and a processor configured to:

execute a search argument simulator, the search argument simulator, when executed by the processor, configuring the processor to generate candidate synthetic search arguments that seek the product in the on-line product catalog based upon the product information or the historical interaction data stored in the memory and target information identifying the product sought by the synthetic search arguments and to select synthetic search arguments from the candidate synthetic search arguments that seek the product in the on-line product catalog based on similarities to search arguments in a historical record of user input search arguments, execute the search engine, the search engine, when executed by the processor, configuring the processor to respond to the synthetic search arguments with the target information, the search engine including a machine translation model that was trained to respond to the synthetic search arguments with the target information, and execute an evaluator, the evaluator, when executed by the processor, configuring the processor to:

monitor a response by the search engine to the synthetic search arguments, the evaluator being configured to determine if the response by the search engine to the synthetic search argument includes the target information, monitor a second response by the search engine to a user input search argument that seeks the product in the on-line product catalog, and trigger retraining of the search engine if the search engine fails to identify the product sought by the user input search argument.

\* \* \* \* \*